(12) United States Patent
Roy et al.

(10) Patent No.: US 10,476,913 B2
(45) Date of Patent: Nov. 12, 2019

(54) INTERCEPTING CALLS FOR ENCRYPTION HANDLING IN PERSISTENT ACCESS MULTI-KEY SYSTEMS

(71) Applicant: salesforce.com, inc., San Francisco, CA (US)

(72) Inventors: Saptarshi Roy, South San Francisco, CA (US); Ryan Lamore, Castro Valley, CA (US); Ankush Gulati, Fremont, CA (US); Navya Sruti Sirugudi, Pleasanton, CA (US)

(73) Assignee: salesforce.com, inc., San Francisco, CA (US)

( * ) Notice: Subject to any disclaimer, the term of this patent is extended or adjusted under 35 U.S.C. 154(b) by 120 days.

(21) Appl. No.: 15/699,553

(22) Filed: Sep. 8, 2017

(65) Prior Publication Data

US 2019/0081990 A1    Mar. 14, 2019

(51) Int. Cl.
| | |
|---|---|
| *H04L 29/06* | (2006.01) |
| *H04L 9/06* | (2006.01) |
| *H04L 9/32* | (2006.01) |
| *G06F 21/62* | (2013.01) |
| *H04L 9/08* | (2006.01) |

(52) U.S. Cl.
CPC ........ *H04L 63/308* (2013.01); *G06F 21/6245* (2013.01); *H04L 9/0618* (2013.01); *H04L 9/0891* (2013.01); *H04L 9/0894* (2013.01); *H04L 9/3234* (2013.01); *H04L 63/061* (2013.01); *G06F 2221/2107* (2013.01)

(58) Field of Classification Search
CPC ... H04L 63/308; H04L 9/3234; H04L 63/061; H04L 9/0618; G06F 21/6245; G06F 2221/2107
See application file for complete search history.

(56) References Cited

U.S. PATENT DOCUMENTS

| | | | | |
|---|---|---|---|---|
| 5,584,023 | A * | 12/1996 | Hsu | G06F 21/6218 |
| 2008/0192937 | A1 * | 8/2008 | Challener | G06F 21/32 380/278 |
| 2013/0013931 | A1 * | 1/2013 | O'Hare | H04L 9/0822 713/189 |
| 2013/0198838 | A1 * | 8/2013 | Schmidt | H04L 9/3234 726/22 |
| 2015/0082399 | A1 * | 3/2015 | Wu | G06F 21/6209 726/6 |

* cited by examiner

*Primary Examiner* — Mohammed Waliullah
(74) *Attorney, Agent, or Firm* — Holland & Hart LLP

(57) ABSTRACT

Some database systems may implement encryption services to improve the security of data stored in databases or on disks. The systems may implement encryption using multiple encryption keys. For example, a worker server may implement a system call interceptor, such as a filesystem in userspace (Fuse) driver. The system call interceptor may intercept system calls (e.g., associated with query or extract, transform, and load (ETL) jobs) as they enter or exit the kernel. The system call interceptor may determine whether data sets associated with the jobs are marked for encryption, and may perform an encryption process on the data sets. A worker may encrypt and store data sets on a worker disk or at a file store, or may retrieve and decrypt the data sets. The system may additionally manage encryption keys, and may provide mechanisms for archiving or revoking encryption keys while maintaining user access to stored data sets.

20 Claims, 19 Drawing Sheets

INTERCEPTING CALLS FOR ENCRYPTION HANDLING IN PERSISTENT ACCESS MULTI-KEY SYSTEMS

FIELD OF TECHNOLOGY

The present disclosure relates generally to database systems and data processing, and more specifically to intercepting calls for encryption handling in persistent access multi-key systems.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

Some users of the cloud platform with strict security requirements (e.g., banks, telecommunication companies, etc.) may require data to be encrypted when stored at rest. However, introducing encryption to user applications may greatly limit the functionality of these user applications or limit access to the data during encryption. Additionally, the users may not have adequate permissions to alter kernel code or user application code to introduce encryption.

DETAILED DESCRIPTION

Figure 1:
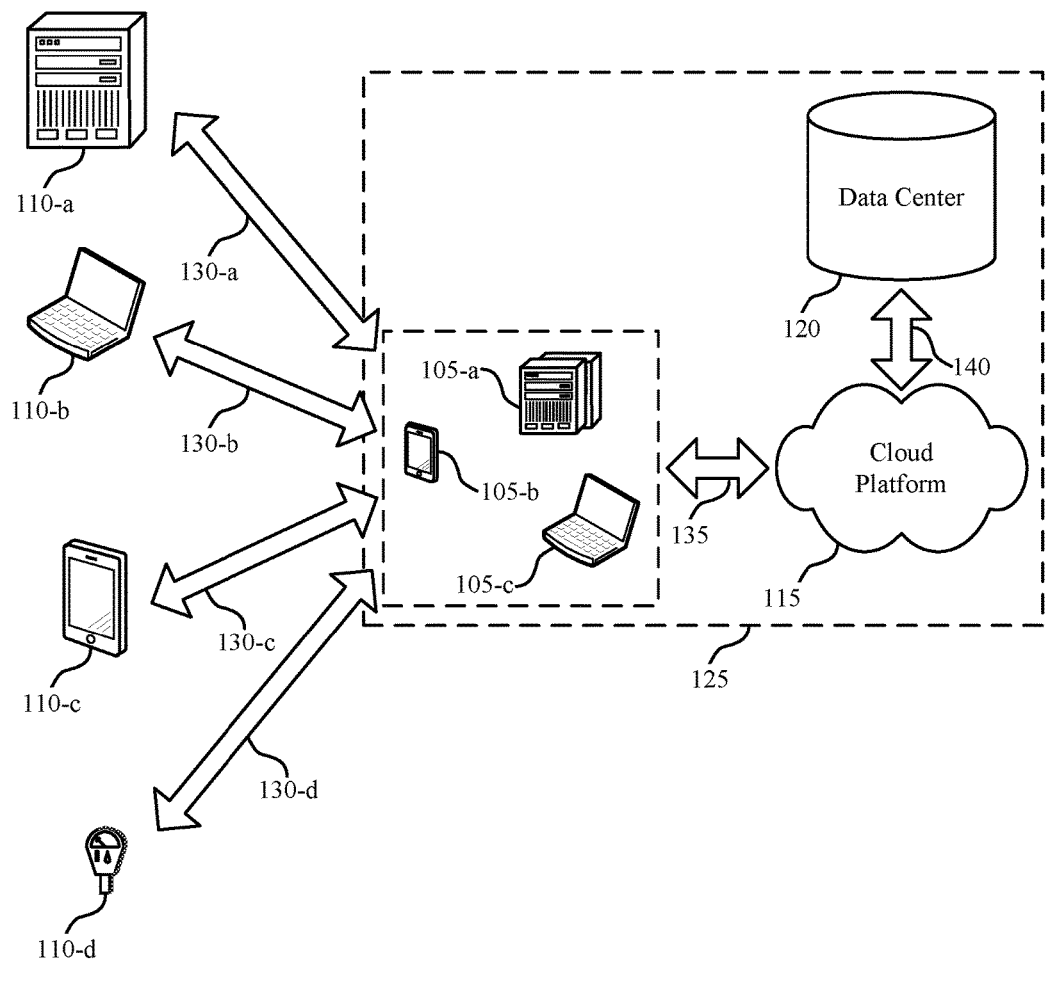
FIG. 1 illustrates an example of a system for encryption management that supports intercepting calls for encryption handling in persistent access multi-key systems in accordance with aspects of the present disclosure.

A user may store encrypted data sets in databases or on server disks based on one or more security requirements. However, many applications in userspace may not support processing encrypted data sets. In order to decrypt data sets for processing in userspace while encrypting the same data sets for storage on disks or in a centralized file store, worker servers may implement system call interceptors. A system call interceptor may be a component of a device driver or a kernel module (e.g., a filesystem in userspace (Fuse) driver, or some other kernel module or kernel extension), and may encrypt or decrypt a data set as it passes between userspace and the kernel. The system call interceptor may support encryption without altering existing user applications, user interfaces, or kernel code, and may operate in a multi-tenant environment with unique tenant-specific encryption keys. The system may additionally provide functionality to modify the multiple encryption keys without restricting user access to the data set.

In a first example, a system call may include a read command (e.g., associated with a query job). The system call interceptor may receive the system call and determine whether the system call corresponds to a data set marked for encryption. If the data set is marked for encryption, the system call interceptor may retrieve an active encryption key (e.g., based on a tenant owner or customer associated with the data set) from a key cache or a key derivation server. The system call interceptor may retrieve the data set from disk, and may decrypt the data set using the customer-specific encryption key. The system call interceptor may then return the decrypted data set, or information related to the decrypted data set, to a user in response to the query job.

In another example, for a system call including a write command (e.g., associated with an extract, transform, and load (ETL) job), the system call interceptor may receive the system call and determine whether the system call corresponds to a data set marked for encryption. If the data set is marked for encryption, the system call interceptor may retrieve an active encryption key (e.g., based on an owner of the data set) from a key cache or a key derivation server. The system call interceptor may encrypt the data set using the encryption key, and may store the data set on a disk of the worker server.

The system may support manageable synchronous or asynchronous encryption keys. Different worker servers or a centralized file store may store a same data set using one or more encryption keys (e.g., based on a user or tenant archiving keys in a key rotation process). The system may also include mechanisms to handle a user revoking an encryption key or a server rebooting during an encryption process. The system may store encryption keys separately from the encrypted data sets for improved data security. In some cases, the system may continuously handle system calls, so that no gap in data access occurs during key management processing (e.g., key rotation processes, encryption key archiving, etc.).

Aspects of the disclosure are initially described in the context of an environment supporting an on-demand database service. Further aspects of the disclosure are described with respect to systems or system architectures implementing system call interceptors, such as Fuse. A key derivation process is then described, along with multiple key management timelines illustrating different scenarios for handling multiple encryption keys. Aspects of the disclosure are further illustrated by and described with reference to apparatus diagrams, system diagrams, and flowcharts that relate to intercepting calls for encryption handling in persistent access multi-key systems.

FIG. 1 illustrates an example of a system 100 for cloud computing that supports intercepting calls for encryption handling in persistent access multi-key systems in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The servers of subsystem 125 may be examples of worker servers or database servers. When a cloud client 105 or contact 110 stores data sets at or retrieves data sets from data center 120, the servers may encrypt the data sets for storage on worker disks. In some cases, a server may implement a system call interceptor at a device driver or kernel extension (e.g., a Fuse driver) in order to encrypt or decrypt a data set on its way in or out of the kernel. The system call interceptor may allow the subsystem 125 to support encryption without altering existing user applications, user interfaces, or kernel code. Additionally, the servers may support handling multiple encryption keys (e.g., for different cloud clients 105 or contacts 110, or for a same cloud client 105 or contact 110). These encryption keys may be rotated, archived, or revoked, and the servers may remain online during these key management processes or any encryption or decryption processes to provide persistent access for cloud clients 105 to the stored data sets.

For example, for a system call including a read command (e.g., associated with a query job), the system call interceptor may receive the system call and determine whether the system call corresponds to a data set marked for encryption. If the data set is marked for encryption, the system call interceptor may retrieve an active encryption key (e.g., based on an owner of the data set) from a key cache or a key derivation server. The system call interceptor may retrieve the data set from a filesystem of the worker server or from a shared file store at data center 120, and may decrypt the data set using the encryption key. The system call interceptor may then return the decrypted data set, or information relating to the decrypted data set, to a cloud client 105 or contact 110 in response to the query job.

In another example, for a system call including a write command (e.g., associated with an ETL job), the system call interceptor may receive the system call and determine whether the system call corresponds to a data set marked for encryption. If the data set is marked for encryption, the system call interceptor may retrieve an active encryption key (e.g., based on an owner of the data set) from a key cache or a key derivation server. The system call interceptor may encrypt the data set using the encryption key, and may store the data set in a filesystem of the worker server. In either example, the system call interceptor may additionally manage one or more encryption keys, as well as handle the archiving or revoking of encryption keys by a tenant or user.

Figure 2:
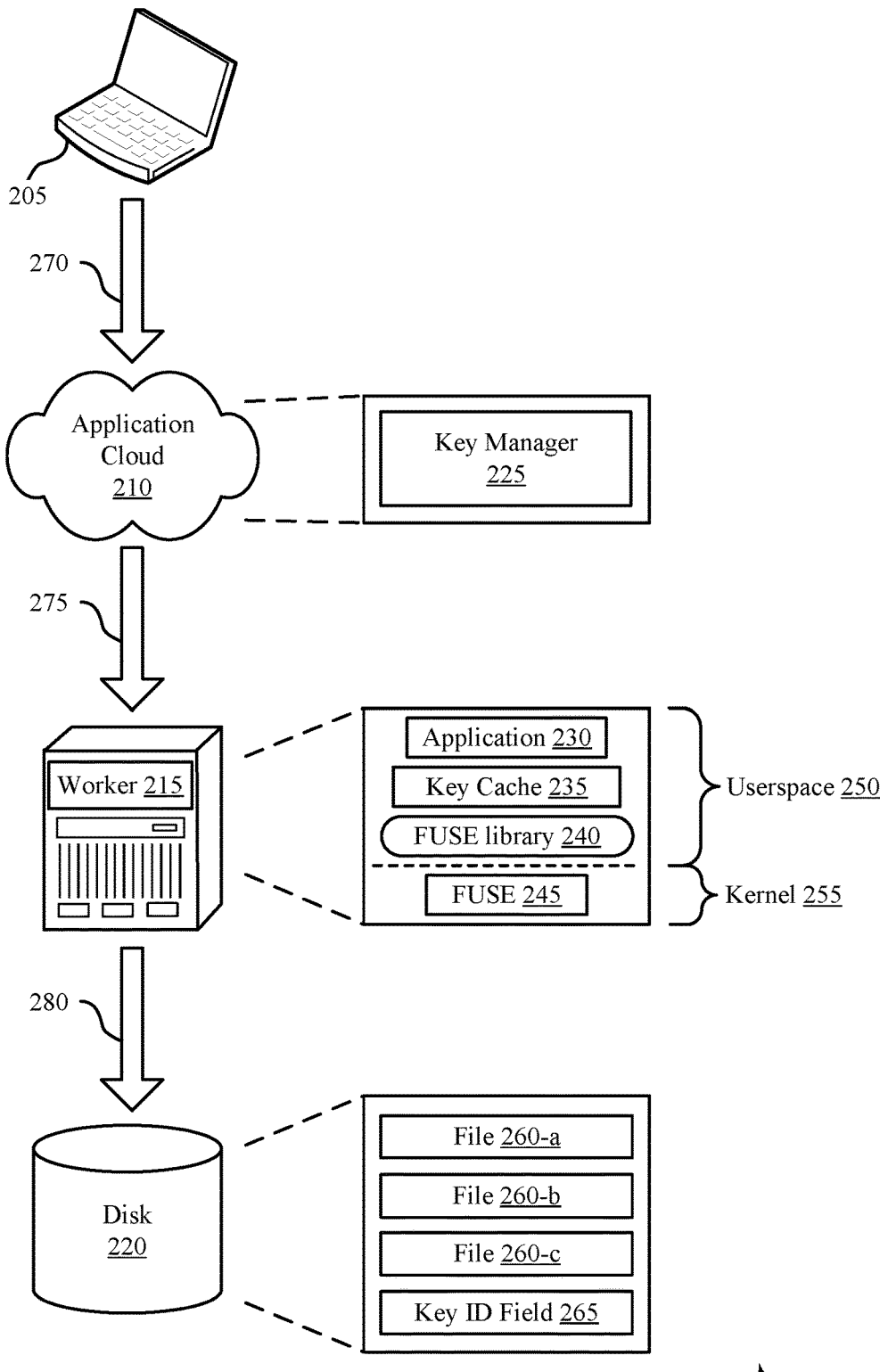
FIG. 2 illustrates an example of a system implementing a filesystem in userspace (Fuse) that supports intercepting calls for encryption handling in persistent access multi-key systems in accordance with aspects of the present disclosure.

FIG. 2 illustrates an example of a system 200 implementing Fuse that supports intercepting calls for encryption handling in persistent access multi-key systems in accordance with various aspects of the present disclosure. The system 200 may include a user device 205, which may be an example of a cloud client 105 or a contact 110; an application cloud 210; a worker 215, which may be referred to as a server, a database server, a worker server, or a fault domain worker; and a disk 220, which may be referred to as a filesystem, and may be an example of a component of the worker 215. The worker 215 may include one or more applications 230 in userspace 250, as well as a system call interceptor, such as Fuse 245, which may operate to intercept information passing between the userspace 250 and the kernel 255. In some cases, the system 200 may include a different type of system call interceptor instead of Fuse 245 (e.g., another device driver or operating system (OS) hook). The worker 215 may perform multitenant encryption processes by intercepting system calls with Fuse 245 and encrypting or decrypting corresponding data sets. The worker 215 may also provide persistent access to data stored on the disk 220 or in a centralized file store while performing the encryption processes or encryption key management processes.

Some systems (e.g., Linux or Unix systems, among others) may include a kernel 255 within the OS. The kernel 255 may include software for managing hardware and system resources. The kernel 255 may include a virtual file system (VFS) that handles interactions with one or more physical filesystems, such as the disk 220. The disk 220 may be an example of a filesystem for the worker 215. In addition to storing data objects locally on worker disks 220, a system may include multiple databases, which may refer to many different types of data storage (e.g., hard disks, optical storage, solid-state storage, removable disks, or any other structure used to store data). Such databases may be shared between multiple workers 215, and may be referred to as centralized file stores. Fileforce (FFX) may be one example of such a file store.

The kernel 255 may perform memory-mapping to manage data files. The kernel 255 may include a page cache, which may contain physical pages stored in random-access memory (RAM). The size of the page cache may change dynamically based on an amount of free memory available at the user worker 215. The kernel 255 may store an indication (e.g., using an array) of a data file or a portion of a data file in the page cache. When searching for a specific data object, the kernel 255 may first check the page cache before retrieving the data from the disk 220 or an external file store if the data file is not identified within the page cache. In this way, utilizing the page cache may reduce the number of calls the kernel 255 makes to disks 220 or external file stores. This may in turn reduce data retrieval latency, as accessing data stored in memory may be orders of magnitude faster than accessing data stored on a disk 220 (e.g., accessing memory may be on the order of nanoseconds, while accessing a disk 220 may be on the order of milliseconds).

When the kernel 255 performs an operation on a data file (e.g., a read function, a write function, or any other function involving kernel interaction with data stored on a disk 220), such as a standard filesystem file, a block device file, or a memory-mapped file, the kernel 255 may store an indication of the data file in the page cache. The page cache may contain data files or indications of data files recently accessed by the user. While the data files remain in the page cache, further modifications to the data files may be performed on the data file stored in the RAM rather than on the data file stored in the backing store (e.g., a hard disk 220). The kernel 255 may perform page writeback to periodically or aperiodically remove one or more data files from the page cache—freeing up memory for other processes or data file storage—and update the one or more data files stored on the disk 220 or an external file store. The kernel 255 may perform this writeback process based on a cache eviction or page-replacement algorithm, such as a least recently used (LRU) algorithm, a two-list algorithm, or a similar algorithm for selecting the data files to remove from the page cache. However, because the kernel 255 reads and writes the data files from and to the disks 220, a user application 230 may not be able to modify these kernel 255 processes.

In kernel mode, a user device 205 or worker 215 may execute code in kernel-space for interrupt handling, memory management, networking communication, or other processes involving managing system calls or hardware. In contrast, the user device 205 or worker 215 may execute user application 230 code in userspace 250. The userspace 250 may interact with the kernel-space using system calls. Based on the system calls, the kernel 255 may allocate system resources for user applications 230 according to device or system permissions, available memory, or other relevant criteria. The system calls may implement software interrupts. For example, a user application 230 may incur a system interrupt (e.g., for an x86 processor, the user application 230 may incur interrupt number 128), triggering the system call handler in the kernel 255. The user device 205 or worker 215 may then switch from user mode to kernel mode and execute kernel code based on the system interrupt number and other parameters indicated to the kernel 255. In some cases, the system call handler may identify the interrupt number, the parameters, or both by reading values from userspace registers (e.g., the interrupt number may be read from the eax register, and the parameters may be read from the ebx, ecx, edx, esi, edi, or any combination of these registers). In other cases, the system call handler may identify the interrupt number, the parameters, or both based on a pointer in userspace 250 that indicates where these values are stored.

Some OS hooks, kernel modules, or device drivers may intercept system calls (e.g., open, close, read, write, truncate, or other system calls) before the user device 205 or worker 215 switches to kernel mode or following execution of code in kernel mode. These system call interceptors may execute user code based on a system call before the user device 205 or worker 215 switches to kernel mode, when the user may no longer be able to specify processes for the user device 205 or worker 215 to perform. One such system call interceptor may be Fuse 245, which may operate based on a Fuse library 235 in userspace 250. However, the system 200 may use any other type of device driver or kernel module as a system call interceptor (e.g., rather than Fuse 245), and may include a corresponding kernel module library rather than the Fuse library 240 in userspace 250. The system call interceptor may specify further functionality for the user device 205 or worker 215 to perform in userspace 250 without altering a user application 230 or the code in the kernel 255. The user device 205 or worker 215 may perform all of the user application 230 processes prior to switching to kernel mode, then may perform the functions specified by the system call interceptor (e.g., Fuse 245), and then may perform the triggered kernel processes. In other cases, the user device 205 or worker 215 may perform functions specified by the system call interceptor on data returned from the kernel 255 in response to a system call, before passing the data back to the user application 230 in userspace 250.

A system call interceptor, such as Fuse 245, may perform encryption processes on data without changing user application code or kernel code. The encryption processes may be transparent (i.e., the encryption process may not alter a user interface of user device 205), and may include encryption, decryption, key rotation, or any other functions involving handling encrypted data. While performing such encryption processes, data objects previously stored to the disk 220 or a centralized file system may remain accessible to the user device 205. In some cases, data objects and data storage may be associated with either a vault directory (e.g., -e/vault) or a raw data directory (e.g., -r/data). The system call interceptor may encrypt data associated with the vault before writing the data to a disk 220, while data associated with raw data may remain un-encrypted when written to the disk 220. Encrypting vault data may involve key management, including encryption key uploading, generating, revoking, rotating, or any combination of these key management processes. Such key management may involve a key manager 225, a key cache 235, or a combination of the two.

A specific implementation example of encryption with system call interceptors may include configuring a Fuse driver for probabilistic encryption. On system startup, the system 200 may mount a system call interceptor (e.g., a device driver, such as a Fuse 245 driver) to intercept calls to the kernel 255. The system call interceptor may determine whether to pass a system call through to the operating system or perform a function based on the system call before passing it through. For example, the system call interceptor may pass most system calls (e.g., exit, fork, link, unlink, time, etc.) through to the operating system or kernel 255 without modification, and may modify a select set of system calls (e.g., open, read, write, release, truncate, getattr, or other system calls that deal with data that may be encrypted). Modifying a system call may further be based on a job payload, and whether the job payload indicates data associated with the vault directory or the data directory. If the data is associated with the vault directory, the system call interceptor may modify the data or a file associated with the system call before passing the system call through to the operating system.

For example, for an open system call associated with the vault directory, the system call interceptor may identify whether the data or file is write-only. The system call interceptor may modify the data or file to support read functionality, as well as write functionality. In some cases, enabling read functionality may allow for encryption of the data or file. The system call interceptor may identify whether the data or file has an associated nonce (e.g., appended at the start of the data or file). A nonce, which may also be referred to as a cryptographic nonce, may be an example of a pseudo-random number, such as a pseudo-random 8 byte combination. If the system call interceptor identifies a nonce, the system call interceptor may read the nonce and retrieve an encryption key based on the nonce. For example, the system call interceptor may either retrieve the encryption key from the key cache 235 or from the key manager 225. In one implementation, the system call interceptor may first query the key cache 235 for the encryption key. If the system call interceptor does not receive the encryption key in response, the system call interceptor may send a request to a key manager 225, which may be physically located at a different worker 215 or server as part of the application cloud 210. The key manager 225 may retrieve or generate the encryption key based on the nonce, and return the encryption key to the worker 215.

The system call interceptor may encrypt or decrypt the data or file using the encryption key, the nonce, or a combination thereof. In some case, if the system call interceptor identifies that the data or file does not include a nonce, the system call interceptor may generate a nonce (e.g., pseudo-randomly) and may append the nonce to the data or file (e.g., at the beginning, at the end, or somewhere throughout the file). The system call interceptor may generate a structure or file to store information relating to the data or file. For example, the system call interceptor may store the encryption key, the nonce, a file descriptor, or some combination of these parameters or indications of these parameters in the structure. During subsequent system call interceptor operations, the system call interceptor may retrieve this structure to handle the encrypted data or file.

For a read system call, the system call interceptor may identify if the data to read is encrypted, and may retrieve the encryption key and nonce in order to decrypt the data. For example, the system call interceptor may retrieve the encrypted data from the disk 220 and may decrypt it, before passing the decrypted data to further processing in the kernel 255 or userspace 250. Similarly, for a write command, the system call interceptor may encrypt the data using the nonce and encryption key, and may store the encrypted data on the disk 220. Other system calls that may be modified by the system call interceptor may include release, truncate, or getattr system calls. For example, the release system call may close a file descriptor and free memory corresponding to the encryption structure. The truncate and getattr system calls may take into account the nonce added to the data or file. For example, the truncate system call may ensure that a nonce is not reused, and the getattr system call may determine and report a file size by taking into account (e.g., subtracting) the data size associated with the nonce.

Fuse 245 may store a copy of the data or file in the page cache of the kernel 255. However, reading from or writing to the disk 220 or a file store may also store a copy of the data or file in the page cache. This may result in double buffered caching, which may inefficiently manage memory for workers 215. Instead, the worker 215 may mark one of the copies of the data or file for deletion from the page cache. In some cases, Fuse 245 and the disk 220 may store two versions of the data in the page cache, an encrypted version and a decrypted version. In such cases, the worker 215 may delete or mark for deletion either the encrypted version or the decrypted version, based on a configuration or a security protocol of the worker 215. In some implementations, storing the decrypted version may improve processing latency, while storing the encrypted version may improve data security.

In the above process, encryption key handling may be supported by functionality of an orchestrator application. The orchestrator application may implement a function (e.g., a function implemented by an application programming interface (API)) that identifies and retrieves an encryption key based on a user or tenant. For example, the orchestrator application may cache encryption keys in memory, and may retrieve encryption keys either from worker memory (e.g., the disk 220) or from a shared file store. The orchestrator application may utilize encryption key services for key management by performing calls to these encryption key services using one or more tokens (e.g., OAuth or Refresh tokens) associated with a query or ETL job. For a query job, the orchestrator application may implement a query engine to parse the query job payload. The query engine may determine whether to retrieve or read the data from the /vault directory (e.g., for encrypted records) or the /data directory (e.g., for plaintext records) based on a flag in the query job payload (e.g., an 'isEncryptionEnabled' flag). Similarly, for an ETL job, the orchestrator application may parse the ETL job payload to determine whether to set the working directory to /vault or /data based on the flag.

The orchestrator application or a data handling platform may retrieve encryption keys for query jobs using one or more security credentials. Additionally or alternatively, the orchestrator application or platform may retrieve encryption keys for ETL jobs using one or more integration credentials. In some cases, the data handling platform may perform encryption or decryption on the data sets. For example, the encryption may be an example of 256-bit advanced encryption standard (AES) encryption in counter (CTR) mode using a random nonce, an open secure sockets layer (OpenSSL) library, hardware acceleration, or some combination of these features. OpenSSL may align with one or more industry standards and support a high level encryption solution, while hardware acceleration may improve performance and lower latency of the encryption process. However, the data handling platform may alternatively use any number of encryption processes or features for encrypting or decrypting data. In some cases, the data handling platform may dynamically switch between different encryption implementations, for example, for different tenants or data security levels. The data handling platform, as well as a key management API, may run continuously on one or more servers while edge services software is running. This may provide continuous encryption services and support for users, and may limit any failed read or write commands based on encrypted data records. These encryption processes may occur as the data records enter or leave a database or the disk 220. In some cases, the data records may be passed between a centralized file store and worker 215 over a hypertext transfer protocol secure (HTTPS) channel.

In some cases, the system 200 may deploy the data handling platform as a package along with edge services software. In some cases, the data handling platform may be the first service deployed during setup or configuration of the system 200 or one or more workers 215. In some cases, the system 200 may temporarily pause ETL job processing while deploying the data handling platform, edge services, or both of these services. In other cases, the system 200 may perform a background deployment of the services to avoid any pause in ETL or query processing. The system 200 may implement a system, network, or infrastructure monitoring application to monitor the data handling platform or the Fuse driver. The monitoring application may alert a worker 215 or the system 200 if Fuse 240 crashes on a host server. The system 200 may restart the Fuse driver if it fails, for example, using a Bash script.

The above process may be performed for encrypting when storing the data to a disk 220. For example, at 270, the user device 205 may send a job (e.g., a query or ETL job) to the application cloud 210. At 275, the application cloud 210 may pass the job to a worker 215. In some cases, at the application cloud 210, the key manager 225 may identify an encryption key for the job, and may pass the encryption key with the job to the worker 215. The worker 215 may encrypt or decrypt a data set based on the job and an encryption key. In one example, at 280, the worker 215 may send a request to the disk 220 to retrieve an encrypted data set, and the worker 215 may decrypt the data set using Fuse 245. In another example, the worker 215 may encrypt a data set associated with the job, and may store the encrypted data set to disk 220 at 280.

The disk 220 may store one or more files 260, which may be examples or components of one or more data sets. The disk 220 may also store a key identifier field 265, which may indicate an encryption key used to encrypt each of the files 260. For example, in a multi-tenant system, file 260-*a* may be associated with a first tenant, file 260-*b* may be associated with a second tenant, and file 260-*c* may be associated with a third tenant. Alternatively, in a single tenant system, files 260-*a,* 260-*b,* and 260-*c* may correspond to a same tenant, but may be encrypted using different encryption keys (e.g., different active encryption keys, archived encryption keys, revoked encryption keys, or left un-encrypted). The disk 220 may store many additional files 260 to those shown in FIG. 2. Key identifier field 265 may indicate an encryption key used to encrypt the files 260. For example, key identifier field 265 may include an indication of an active encryption key associated with the first tenant, and a different active encryption key associated with the second tenant. The worker 215 may identify an encryption key for decrypting the files 260 based on the key identifier field 265. However, the disk may not store any encryption keys (e.g., just identifiers of the encryption keys) to improve security of files 260 stored on the disk 220. Some files 260 stored on the disk 220 may not be encrypted. For example, file 260-*c* may not be encrypted on the disk 220, and the key identifier field 265 may not include any indication of an active encryption key for the third tenant. In this way, the disk 220 for worker 215 may store both unencrypted data and encrypted data, and the encrypted data may be encrypted using any number of different encryption keys corresponding to different tenants.

In some cases, rather than encrypt data based on a job sent from the user device 205, the system 200 may encrypt data previously stored to the disk 220 or a centralized file store. For example, the worker 215 may retrieve one or more data sets from data storage on the disk 220 or in an external file store, and may encrypt the data sets before returning the data sets to storage. Such a process may run as a background process on groups of data sets stored on disk 220 to transition tenant data from plaintext to ciphertext.

Figure 3:
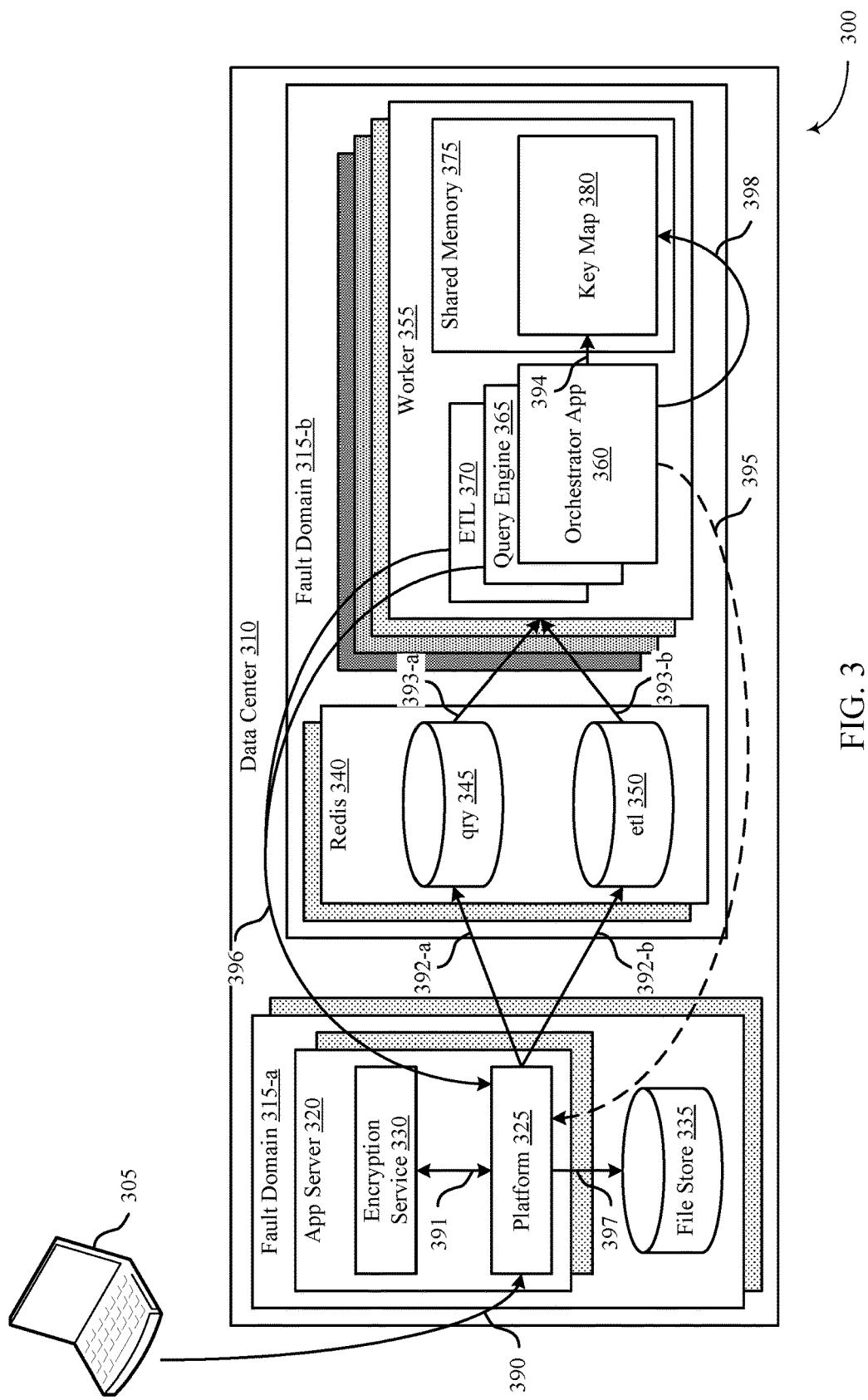
FIG. 3 illustrates an example of a system architecture that supports intercepting calls for encryption handling in persistent access multi-key systems in accordance with aspects of the present disclosure.

FIG. 3 illustrates an example of a system architecture 300 that supports intercepting calls for encryption handling in persistent access multi-key systems in accordance with various aspects of the present disclosure. The system architecture 300 may include a user device 305, which may be an example of a cloud client 105, a contact 110, or a user device 205 as described with reference to FIGS. 1 and 2. The system architecture 300 may further include a data center 310, which may be an example of a data center 120 as described with reference to FIG. 1. The data center 310 may include multiple components, including but not limited to workers 215, disks 220, or aspects associated with application clouds 115 or 210. User device 305 may initiate an encryption process based on reading data from or writing data to the data center 310. The encryption process may be performed based on a worker 355 intercepting a call associated with either the read or write command.

At 390, the user device 305 may make a call to the data center 310. For example, a user may input code or parameters to trigger the user device 305 to store or retrieve a data record from the data center 310. A fault domain or availability zone, such as fault domain 315-*a* of the data center 310 may receive the call from the user device 305. In fault domain 315-*a*, an application server 320 utilizing a platform 325, such as an analytics platform, may process the call, which may be an example of a query job or an ETL job. A query job payload may include an indication of a data set to retrieve from memory (e.g., worker local memory or memory storage for a disk), while an ETL job payload may include a data set to store to memory. A data set may be an example of one or more data files, data records, data tables, or any other information stored in memory or to a disk or filesystem. In some cases, the data set may be associated with a tenant or organization implementing encryption. To determine whether or not the call is marked for encryption, the platform 325 may check an encryption service 330 at 391. The platform 325 may include information in the query or ETL job payload indicating whether encryption is enabled (e.g., by setting an encryption flag in the payload).

At 392, the application server 320 may send the job payload to Redis 340, which may be an example of a server contained within a fault domain 335, such as fault domain 315-*b*. In some cases, this may be an example of a different fault domain 315 as fault domain 315-*a*. In Redis 340, the job payload may be passed to either a query router 345 or an ETL router 350. For example, if the user call indicates a read command for a data set, the call may be an example of a query job, and the application server 320 may send the query job payload to the query router 345 at 392-*a*. Alternatively, if the user call indicates a write command for a data set, the call may be an example of an ETL job, and the application server 320 may send the ETL job payload to the ETL router 350 at 392-*b*. The query router 345 or ETL router 350 may assign the job to a worker 355, and may rout the job payload to the assigned worker 355 at 393 (e.g., either 393-*a* or 393-*b*). The assigned worker 355 may be an example of a Fuse driver.

At worker 355, an orchestrator application 360 may parse the job payload to determine whether encryption is enabled for the associated data set. If encryption is not enabled, the orchestrator application 360 may pass the job payload to either a query engine 365 or an ETL engine 370 to retrieve or store the corresponding data set without performing any encryption processing. However, if encryption is enabled, the orchestrator application 360 may identify and retrieve an encryption key associated with the job. In some cases, a query job may retrieve data associated with one or more encryption keys, and the orchestrator application 360 may perform multiple iterations of the following key retrieval process. The orchestrator application 360 may identify a tenant identifier associated with the data set, and at 394 may send the tenant identifier to shared memory 375 to check for a corresponding encryption key. In shared memory 375, the worker 355 or another server may store a key map 380 including tenant identifiers and corresponding active encryption keys. In some cases, the key map may also store one or more archived encryption keys. The key map 380 may search for the tenant identifier and an associated encryption key, and if the key map 380 identifies an active encryption key associated with tenant identified, the orchestrator application 360 may retrieve or receive the active encryption key (e.g., from a key cache of worker 355 or shared memory 375).

In cases where the key map 380 does not identify an active encryption key associated with the tenant identifier (e.g., if the key map 380 does not include any indication of the tenant, does not include an active encryption key for the tenant, etc.), the orchestrator application 360 may not receive an encryption key from the key map 380. In some cases, the key map 380 may return an indication that the key retrieval from shared memory 375 failed. At 395, the orchestrator application 360 may optionally transmit an API call to the platform 325 or a centralized file store 335 requesting the encryption key, for example, if the encryption key is not identified in the key map 380. The orchestrator application 360 may transmit the API call using one or more tokens, such as OAuth or refresh tokens. The platform 325 and the encryption service 330, which may include key management and key derivation services, may generate or identify the encryption key corresponding to the tenant identifier based on the API call. The platform 325 may return the encryption key to the orchestrator application 360, which may store an indication of the active encryption key and associated tenant identifier in the key map 380 of shared memory 375. The worker 355 may store a copy of the encryption key in local worker memory in a worker 355 level cache, or may store a copy of the encryption key in a fault domain 315 level cache. In some cases, the worker 355 may store the encryption key in a key cache within a Fuse driver. In all of these cases, the worker 355 may not store or persist the encryption key in a disk of the worker 355. This may stop the worker 355 from storing encrypted data and the corresponding encryption key in a same storage system.

Once the orchestrator application 360 has the encryption key, the orchestrator application 360 or another component of the worker 355 may process the data set with one or more encryption keys. For a query job, the orchestrator application 360 may pass the indication of the data set and the one or more encryption keys to a query engine 365. The worker 355 may retrieve the indicated data set from disk or from memory (e.g., a page cache for the worker 355), and may decrypt the data set using the one or more encryption keys. Once the data set is encrypted, the query engine 370 may perform further processes on the data set based on the query request.

For an ETL job, the orchestrator application 360 or the worker 355 may write an identifier of the encryption key to the data set. The worker 355 may include an unencrypted version of the encryption key identifier in an original key identifier file. For example, the worker 355 may write the encryption key identifier to signature.json, which may be a component of the directory of the data set. This may guard against worker 355 reboots during the ETL process, as described below with respect to FIG. 12. Further, the original key identifier may track the encryption key used to create the data set, rather than an encryption key later used to fetch the data set from disk. This may improve support for archiving or revoking encryption keys, as described below with respect to FIGS. 10 and 11. The orchestrator application 360 may pass the data set, including the original key identifier, and the encryption key to an ETL engine 370. The worker 355, using the ETL engine 370, may encrypt each file for the data set using the active encryption key. The worker 355 may then write the encrypted data set to a disk of the worker 355 or fault domain 315-*b*.

The above encryption processes and encryption key retrieval processes may be performed transparently. For example, a user sending the call at 390 may not receive any indication of whether or not the data set is encrypted or decrypted. The worker 355 performing the encryption and key management processes may be an example of a device driver that intercepts system calls, such as a Fuse Driver, and may perform the processing without altering a user interface or applications at the user device 305.

At 396, the worker 355 or its components (e.g., the query engine 365 or ETL engine 370) may send the data set or results back to the platform 325. For example, for ETL jobs, following storage of the data set to a filesystem of the worker 355 at the ETL engine 370, the worker 355 may send the encrypted data set or an unencrypted version of the data set to the platform 325. The platform 325 may send the data set to a centralized file store 385 at 397. The file store 385 may encrypt the data set as it enters the database. In some cases, the platform 325 or the data center 310 may send an indication to the user device 305 that the data set is stored in the file store 335. For query jobs, following decryption of the data set at the query engine 365, the worker 355 may send the results of the query to the platform 325, and the platform 325 or the data center 310 may transmit the query results to the user device 305.

In some examples, an orchestrator application 360 may periodically (e.g., every hour, or some other time interval) or aperiodically (e.g., based on a trigger) refresh the key map 380 in shared memory 375. During the key map 380 refresh, the orchestrator application 360 may remove or update encryption keys from the key map 380. For example, the orchestrator application 360 may remove revoked encryption keys or encryption keys that have not been accessed recently (e.g., based on a pre-determined or dynamic time threshold). The orchestrator application 360 may also replace archived encryption keys with active encryption keys by transmitting an API call to the centralized file store 335, such as at 395, to retrieve the active encryption key associated with a user, tenant, organization, or data set.

Figure 4:
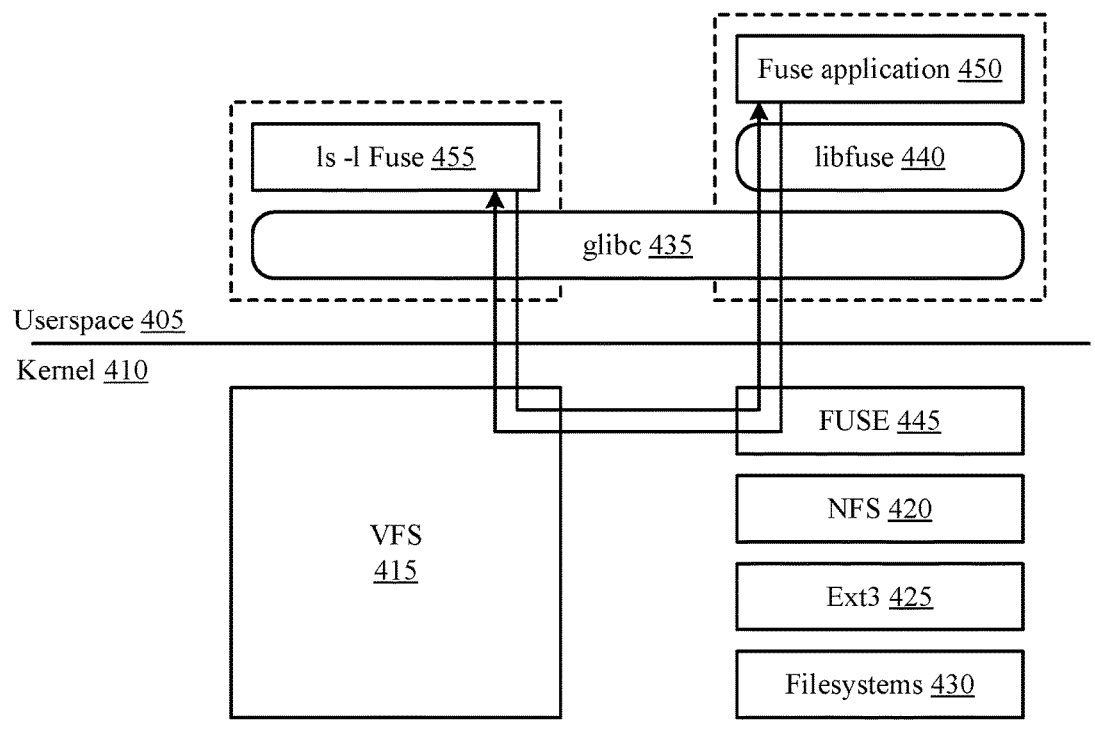
FIG. 4 illustrates an example of a system implementing Fuse that supports intercepting calls for encryption handling in persistent access multi-key systems in accordance with aspects of the present disclosure.

FIG. 4 illustrates an example of a system 400 implementing Fuse that supports intercepting calls for encryption handling in persistent access multi-key systems in accordance with various aspects of the present disclosure. The system 400 may contain libraries, modules, and filesystems in userspace 405 and in the kernel 410. For example, the kernel 410 may include a VFS 415, a network filesystem (NFS) 420, a third extended filesystem (ext3) 425, additional filesystems or connections to filesystems 430, or any combination of these filesystems. To implement Fuse, the system 400 may include a C standard library (e.g., the GNU C library (glibc) 435), a libfuse userspace library 440, a Fuse kernel module 445, a Fuse application 450, or some combination of these components. Additionally, the system 400 may include an ls -1 command 455 for the Fuse directory. These libraries, modules, and filesystems may perform encryption or decryption on data sets for intercepted system calls.

In some cases, Fuse application 450, libfuse userspace library 440, Fuse kernel module 445, or some combination of these may be referred to as a Fuse driver and may include executable code in one or more programming languages, such as C. The Fuse driver may process and execute code using C to efficiently integrate the Fuse driver with OpenSSL libraries, Fuse software interfaces, an Apache Thrift glibc 435, or some combination of these. Additionally, using C may result in fast and/or efficient code, minimal processing for switching between different programming languages, or minimal performance degradation. The system 400 may implement Apache Thrift—or some other remote procedure call (RPC) processor—to perform edge services and support the Fuse driver. Apache Thrift may provide good performance at scale for encrypting data.

Fuse 445 may intercept OS function calls on their way in or out of the kernel 410, and may operate for one or more distributed file systems. For example, a Fuse application 450 operating in userspace 405 may indicate data to write to or read from a filesystem, such as the VFS 415, the NFS 420, the ext3 425, or some other filesystem 430. The Fuse application 450 may execute functions or OS calls defined in the libfuse 440 or the glibc 435 to interact with the Fuse kernel module 445. For example, the Fuse kernel module 445 may intercept a system call from the Fuse application 450, and may process the system call based on libfuse 440 or glibc 435 functions. The Fuse kernel module 445 may identify whether data associated with the system call is marked for encryption. In some cases, the Fuse kernel module 445 may check the VFS 415 or may utilize an ls -1 command 455 for the Fuse directory to determine whether the data is associated with a /vault directory (e.g., for encrypted data) or a /data directory. If the data is determined to be marked for encryption, the Fuse kernel module 445 may perform encryption processes on the data as it enters or leaves the kernel 410. For example, for a write command, the Fuse kernel module 445 may encrypt the data (e.g., based on a manageable encryption key associated with the data or an owner of the data), and may store the encrypted data in the VFS 415, as well as in an external filesystem, such as the NFS 420, the ext3 425, or another external filesystem 430. Similarly, for a read command, the Fuse kernel module 445 may retrieve the data from a filesystem, may decrypt the data using an encryption key, and may return the decrypted data to the Fuse application 450 in userspace 405. In some cases, the Fuse kernel module 445 may first attempt to retrieve the data from the VFS 415, and failing that may retrieve the data from an external filesystem. In either case, the Fuse driver may perform the encryption process, and may not alter other applications or processes in either userspace 405 or the kernel 410.

Figure 5:
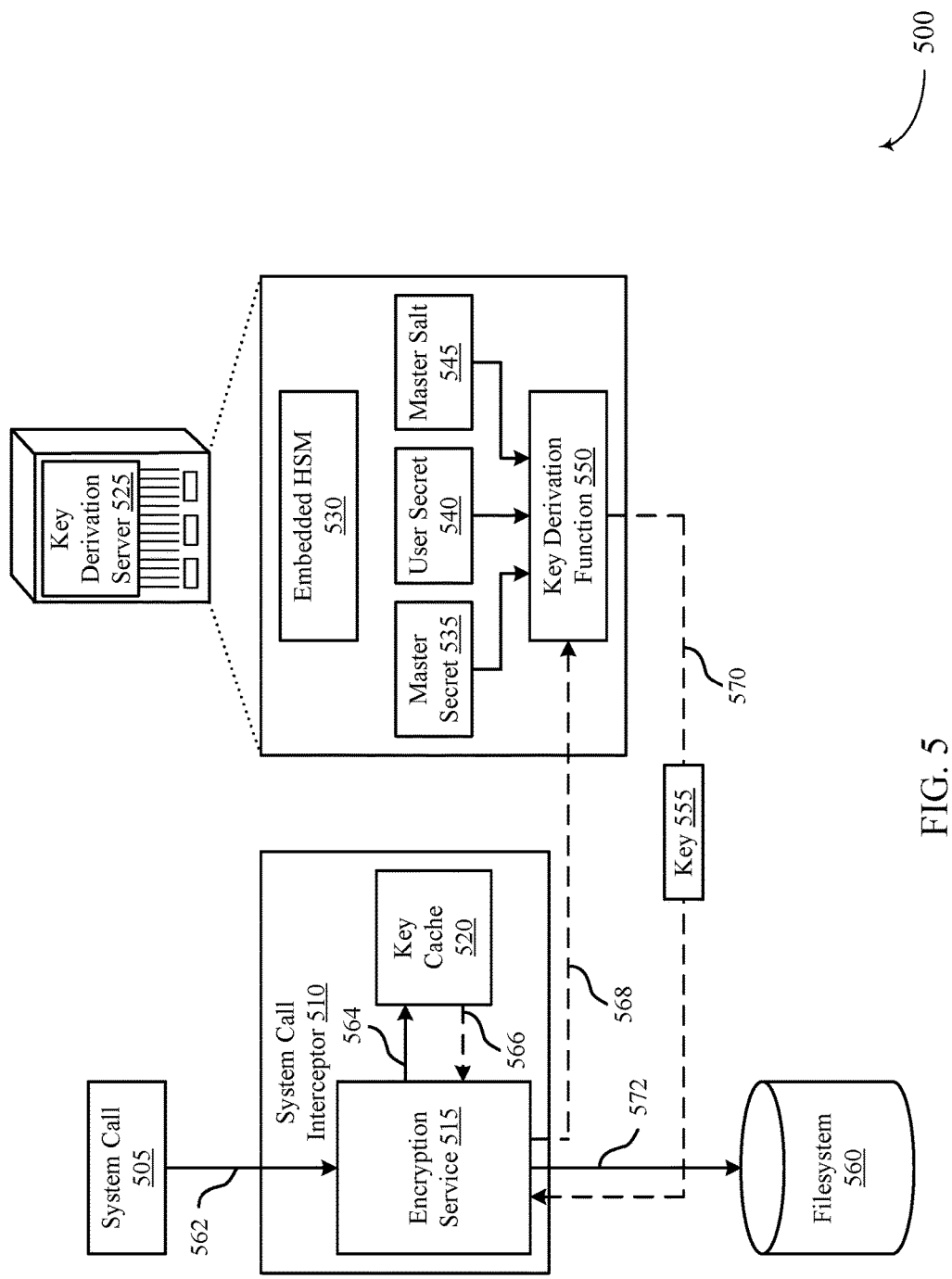
FIG. 5 illustrates an example of a key derivation process that supports intercepting calls for encryption handling in persistent access multi-key systems in accordance with aspects of the present disclosure.

FIG. 5 illustrates an example of a key derivation process 500 for intercepting calls for encryption handling in persistent access multi-key systems in accordance with various aspects of the present disclosure. A system call 505 may trigger an encryption service 515. In some cases, a user device—such as a cloud client 105, a contact 110, or a user device 205 or 305, as described in FIGS. 1 through 3—may initiate the system call 505 based on a user command or executable code. A system call interceptor 510, which may be a component of a worker, may intercept the system call 505 on its way between userspace and the kernel. For example, system call interceptor 510 may operate in userspace directly prior to or following performing kernel processes. The system call interceptor 510 may perform an encryption service 515 based on the system call 505, and using an encryption key 555 generated by a key derivation server 525.

A filesystem 560 may implement encryption to block users without a certain authorization level from viewing data. Encryption may provide security for data at rest (i.e., data stored in the filesystem 560 of a worker, which may be an example of a worker disk), and may or may not provide security for data being transmitted or received. In some cases, the filesystem 560 or a disk may additionally implement security for data being transmitted or received, such as transport layer security. In some cases, a user may turn encryption on or off, and may specify the data for encryption. Similarly, a user may turn indexing on or off, based on security levels or desired functionality for the data. Some examples of data a user may select to encrypt include personally identifiable information (PII), sensitive, confidential, or proprietary data, or any other data that the user wants to stop unauthorized users from accessing in the filesystem 560. In some cases, the encrypted data may be a data field within a data object, a data file, or an attachment.

In some cases, an encryption service 515 may incur a tradeoff between data security and functionality. For example, a user may run functions on data objects in a worker server. However, some of these functions may not be designed to run on encrypted data. The encryption service 515 may be an example of probabilistic encryption (i.e., non-deterministic encryption, such as strong symmetric non-deterministic encryption), or may be an example of deterministic encryption. In some cases, probabilistic encryption may support less functionality than deterministic encryption, but may provide better data security. In one example, the encryption service 515 may be an example of a probabilistic encryption process utilizing the AES with 256-bit keys. The encryption process may additionally use cipher block chaining (CBC), public key cryptography standards (PKCS) for padding (e.g., PKCS #5), a random initialization vector (IV), or any combination thereof. By operating the system call interceptor 510 between userspace and kernel processes, the system may limit the number of unsupported functions for encrypted data.

At 562, the system call interceptor 510 may intercept a system call 505 (e.g., a read or write system call). In some cases, the system call 505 may be associated with data corresponding to a vault directory. In such cases, the system call interceptor 510 may perform an encryption process (e.g., encryption or decryption) on the data using the encryption service 515. In some cases, the system call 505 may indicate data to encrypt and write to a filesystem 560. In other cases, the system call 505 may indicate data to decrypt and read from the filesystem 570 or a file store.

At 564, the encryption service 515 may request an encryption key 555 from a key cache 520, which may be locally stored on the worker. An encryption key 555 that was recently used may be stored in the key cache 520, which may be an example of an application server cache. For example, when the encryption service 515 encrypts or decrypts data using an encryption key 555, the encryption service 515 may store the encryption key 555 in the key cache 520. However, the encryption key 555 may not persist in the key cache 520. For example, the key cache 520 may flush its storage or remove the encryption key 555 based on a cache replacement algorithm (e.g., an LRU cache algorithm) or an orchestrator routine. The key cache 520 may identify whether it contains the encryption key 555 corresponding to the data to be encrypted (e.g., based on metadata associated with the data, a tenant associated with the data, etc.). If the key cache 520 identifies the encryption key 555, the key cache 520 may send the encryption key 555 to the encryption service 515 at 566. Otherwise, the key cache 520 may send an indication to the encryption service 515 that the key cache 520 does not contain the encryption key 555. In some cases, the key cache 520 may not send an indication to the encryption service 515, and the encryption service 515 may determine to derive the encryption key 555 based on not receiving a response from the key cache 520 (e.g., not receiving the response within a pre-determined time interval).

At 568, the encryption service 515 may send a derivation request to a key derivation server 525 based on not receiving the encryption key 555 from the key cache 520. The key derivation server 525 may include one or more embedded hardware security modules (HSMs) 530, a master secret 535, a user secret 540, a master salt 545, or any combination thereof. The embedded HSMs 530 may be examples of computing devices used to secure and manage encryption keys 555. The master secret 535 and the master salt 545 may be generated periodically or aperiodically (e.g., at the start of each new software release). The master secret 535 may be generated based on a master HSM, which may be physically located at a different location than the key derivation server 525. The user secret 540 may be input by a user or generated on demand based on the embedded HSMs 530. The master secret 535, the user secret 540, the master salt 545, or any combination of these may be input into a key derivation function 550 (e.g., a password-based key derivation function 2 (PBKDF2)). Based on receiving the derivation request along with the master secret 535, the user secret 540, the master salt 545, or a combination of these, the key derivation function 550 may generate an encryption key 555. At 570, the key derivation server 525 may send the encryption key 555, which itself may be encrypted, to the encryption service 515 or the key cache 520.

The encryption service 515 may receive the encryption key 555 (e.g., either from the key cache 520 or the key derivation server 525). If the system call 505 indicates to write encrypted data to the filesystem 560, the encryption service 515 may use the encryption key 555, along with a random IV in some cases, to encrypt the data from plaintext into ciphertext. At 572, the encryption service 515 may store the encrypted data in the filesystem 560, along with metadata associated with the data. The associated metadata may include an indication that the data is encrypted, an identifier of the user secret 540 used to derive the encryption key 555, the random IV used for encryption, or some combination of these parameters. If the system call 505 indicates to read encrypted data from the filesystem 560, the encryption service 515 may use a user secret 540 indicated in the filesystem 560, a random IV indicated in the filesystem 560, the encryption key 555, or some combination of these to decrypt the data. The system call interceptor 510 may pass the decrypted data to a user or a worker for further processing. In both encryption and decryption, the encryption service 515 may store the encryption key 555 in the key cache 520.

A key management system may support rotating encryption keys 555, revoking encryption keys 555, or both. The system may remain online and support user access to encrypted data throughout these key rotation processes. Encryption keys 555 that support such functionality may be referred to as manageable keys. Manageable keys may result in one or more time-based key validity scenarios for a worker to handle. The key management system may implement a key handling technique to support manageable keys in a centralized file store or database and in the workers.

In a first key management technique, the file store and the workers may encrypt all records for a tenant using a same active encryption key 555 corresponding to that tenant. Each time data is sent to or retrieved from the file store or a worker filesystem, the system may perform an encryption process on the data (e.g., encrypting or decrypting the data) using the active encryption key 555. When the dataset is written to the file store, an identifier of the active encryption key 555 may be written to a key identifier data field in the file store. The centralized file store (e.g., FFX) and the workers may use the active encryption key 555 to encrypt the dataset if it is passed to them.

In a second key management technique, the file store and workers may once again encrypt all records for a tenant using a same active encryption key 555 corresponding to that tenant. However, in this technique, each worker may encrypt or decrypt records as the records enter or leave the worker. The file store may simply write the records it receives. For example, a worker may transmit an encrypted record to the file store, and the file store may simply store the encrypted record without performing any decryption or re-encryption process. In some cases, such a technique may implement one or more jobs that do not pass through the system call interceptor 510 (e.g., Fuse), and may instead connect directly to the drive.

In a third key management technique, the file store and workers may use different encryption keys 555 to encrypt or decrypt data. Some examples of scenarios that may arise based on this key management technique are presented in FIGS. 6 through 12.

In some cases, a system may implement asynchronous encryption keys 555. In such a system, records stored at different devices may be encrypted using different encryption keys 555. For example, a record stored at a centralized file store may be encrypted using a first encryption key 555. At the same time, the same record stored at a filesystem 560 of a worker server (e.g., a worker server including system call interceptor 510) may be encrypted using a second encryption key 555. In some cases, the first or second encryption keys 555 may be an example of an active key, an archived key, or a revoked key.

In other cases, the system may implement synchronized encryption keys 555. For example, the system may include a re-encryption batch job for rotated encryption keys 555. In one case, the system may perform a key rotation process for a tenant. The key rotation process may trigger the re-encryption batch job. In another case, a user may select to trigger the re-encryption batch job. In either case, the encryption service 515 may update all records encrypted using an archived or revoked encryption key 555. These records may include records stored in the filesystem 560, records stored in a file store (e.g., FFX), and records stored on one or more other worker servers. For example, the file store or filesystem 560 may trigger purging or re-encryption of all records associated with the tenant, and may identify any worker servers with locally cached records associated with the tenant. In a purge, all identified workers may remove any records associated with the tenant from local worker filesystems 560. In a re-encryption, the identified workers may decrypt the records associated with the tenant using an archived version of an encryption key 555, and may re-encrypt the records using a new active encryption key 555 (e.g., a rotated version of the encryption key 555). Alternatively, the identified workers may remove the records associated with the tenant, and may fetch records encrypted using the new active encryption key 555 from the file store. In the asynchronous or synchronous systems, the worker servers and file store may provide persistent access to data files. For example, the system may remain online during the key rotation process, so that the system may continue to process system calls 505 based on read or write user commands.

Figure 6:
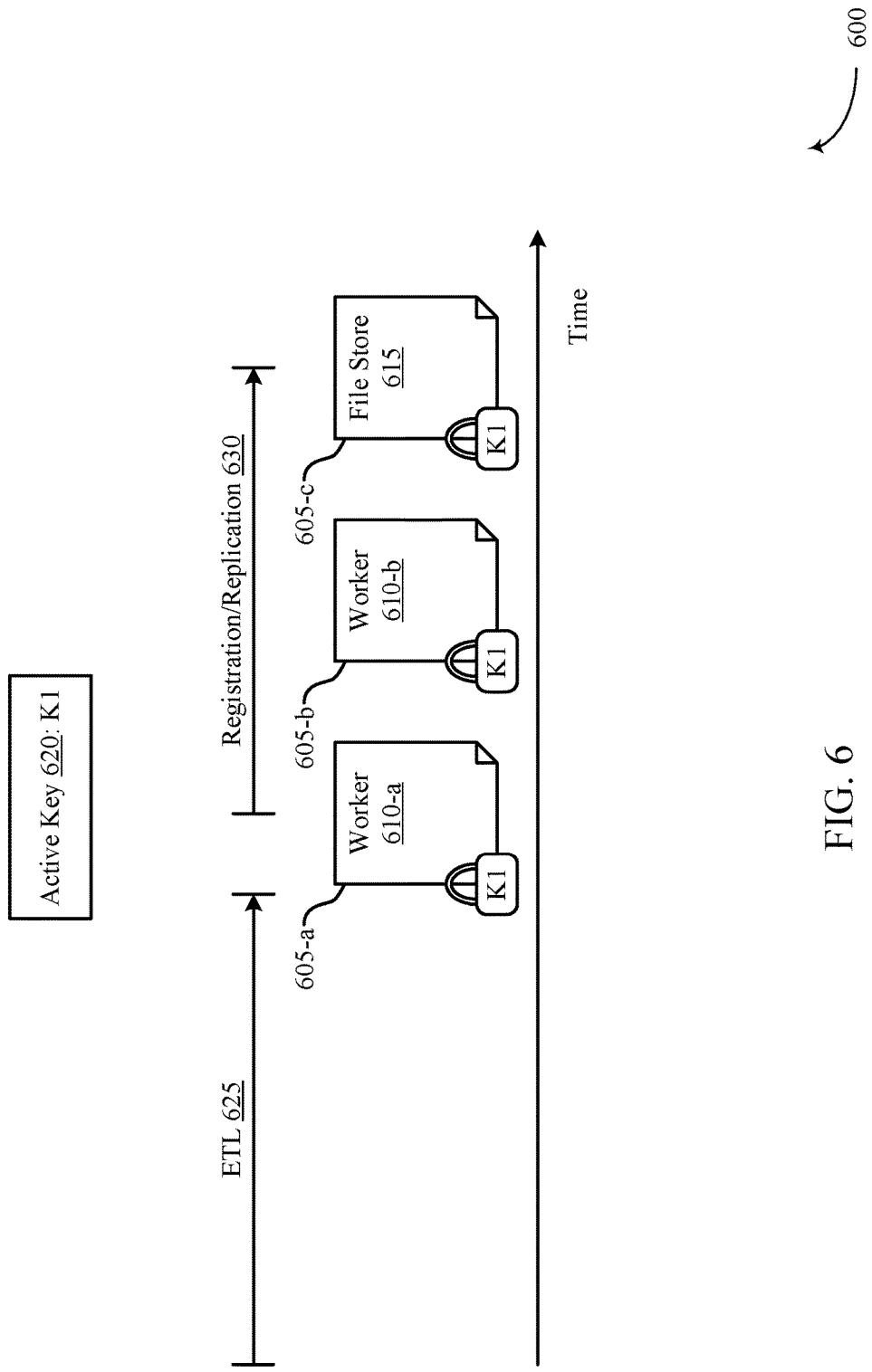
FIGS. 6 through 12 illustrate examples of key management timelines that support intercepting calls for encryption handling in persistent access multi-key systems in accordance with aspects of the present disclosure.

FIG. 6 illustrates an example of a key management timeline 600 for intercepting calls for encryption handling in persistent access multi-key systems in accordance with various aspects of the present disclosure. The key management timeline 600 may illustrate a system for encrypting data using local keys, rather than one or more global keys. These keys may be examples of tenant-specific encryption keys in a multitenant system. The system may include multiple workers 610, which may be examples of servers, and in some cases may be referred to as fault domain workers. A worker may be an example of a set of systems, network infrastructure, storage infrastructure, or some combination of these that may perform isolated services within a data center. The key management timeline 600 may illustrate generating a dataset 605 using an encryption key 620, and registering and replicating the dataset 605.

Different workers 610 may write datasets 605 to disk at different times. In some cases, worker 610-*a* may generate dataset 605-*a* based on an ETL job 625, and may write dataset 605-*a* to its disk (i.e., filesystem). In other cases, worker 610-*a* may retrieve an existing dataset 605 from file store 615, and may write the existing dataset to 605 its disk (e.g., following modification of the dataset 605). When writing a dataset 605 to disk, worker 610-*a* may determine whether the dataset 605 is marked for encryption. If the dataset 605 is marked for encryption, worker 610-*a* may encrypt the dataset 605 using an active key 620 (e.g., K1). This encryption process may be performed by a system call interceptor, a device driver, or an OS hook, such as a Fuse driver. Worker 610-*a* may register the encrypted dataset 605 in file store 615 (e.g., which in some cases may be FFX). Additionally or alternatively, worker 610-*a* may replicate the dataset 605 onto a second worker 610 (e.g., second worker 610-*b* may fetch the dataset 605 from worker 610-*a*). If the active key 620, K1, remains active for the entire registration/replication process 630, dataset 605-*a* may be encrypted with the same active key 620 for worker 610-*a*, worker 610-*b*, and the file store 615. For example, encrypted datasets 605-*a*, 605-*b*, and 605-*c* may each be encrypted using the same active key 620, and may correspond to the same plaintext dataset.

Figure 7:
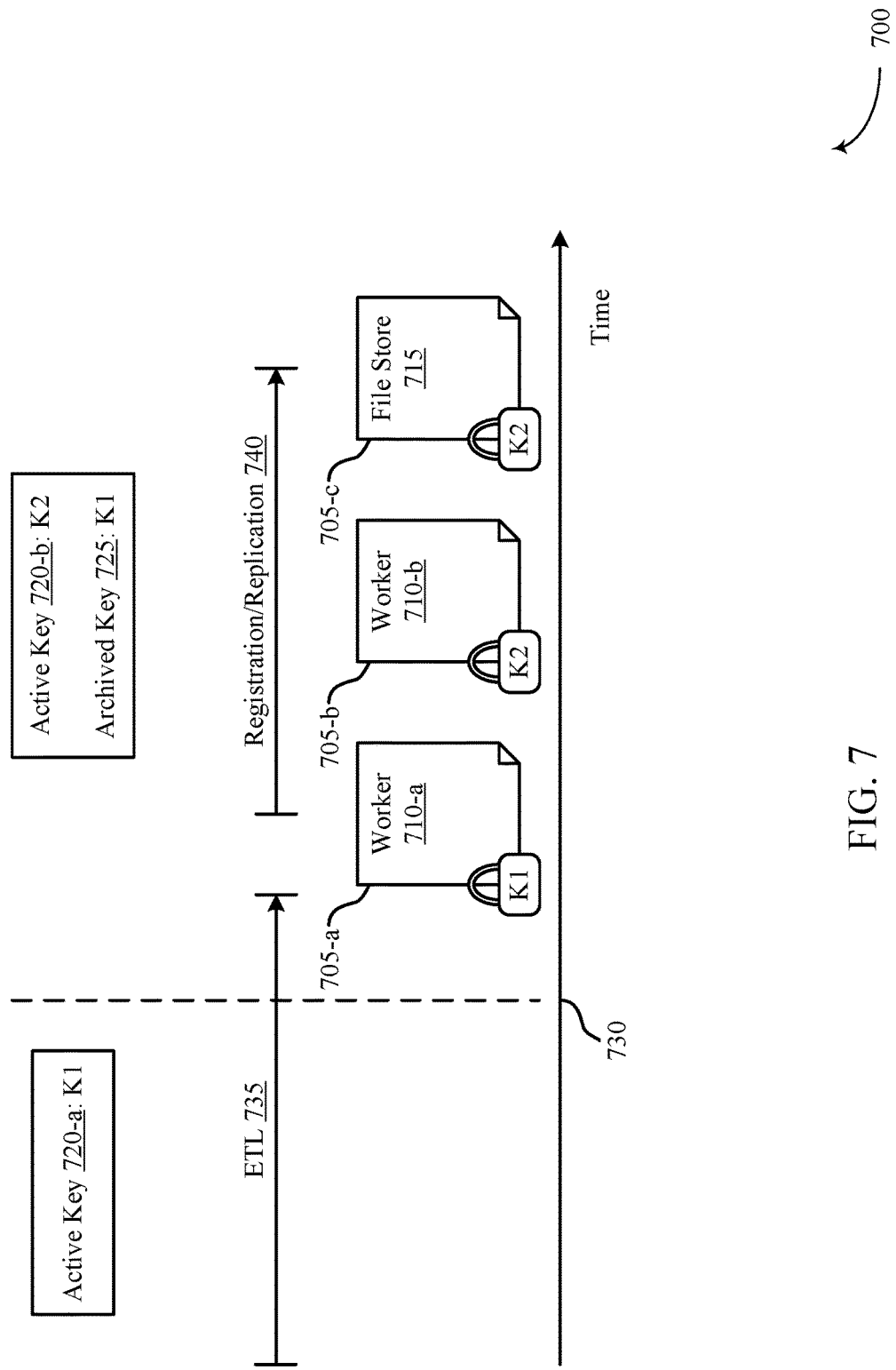

FIG. 7 illustrates an example of a key management timeline 700 for intercepting calls for encryption handling in persistent access multi-key systems in accordance with various aspects of the present disclosure. The key management timeline 700 may illustrate a system encrypting datasets 705 while undergoing a key rotation process. For example, a system may rotate an encryption key at time 730. In such cases, different workers 710 or the file store 715 may store the same dataset 705 encrypted using different encryption keys.

In one possible implementation, a first worker 710 (e.g., worker 710-*a*) may begin an ETL job 735 at a first time. Before completion of the ETL job 735, before registering the dataset 705 with the file store 715, or before beginning replication to a second worker 710 (e.g., second worker 710-*b*), the system may undergo a key rotation process at time 730 for a certain tenant associated with the dataset 705. For example, before time 730, the tenant may use first active key 720-*a* (e.g., K1). Following the key rotation process, the tenant may use second active key 720-*b* (e.g., K2) and may update K1 to be an archived key 725 for the tenant. Such a key rotation process may be triggered by a user switching a tenant secret. First active key 720-*a* may be generated based on a first tenant secret, and second active key 720-*b* may be generated based on a second tenant secret.

In such an implementation, worker 710-*a* may encrypt the dataset 705 using first active key 720-*a* based on the ETL job 735 starting before the key rotation process. However, when performing a registration/replication process 740, second worker 710-*b*, the file store 715, or both may encrypt the dataset 705 using the second active key 720-*b*. In this way, within the system, worker 710-*a* may store the dataset 705 on its disk as encrypted dataset 705-*a* using an archived key 725—K1—and worker 710-*b* and the file store 715 may store the same dataset 705 as encrypted datasets 705-*b* and 705-*c*, respectively, using active key 720-*b*—K2. In some cases, one or more workers 710 may store datasets 705 to disk using an active key 720, while one or more workers 710 may store datasets 705 to disk using an archived key 725 of a set of archived keys.

Figure 8:
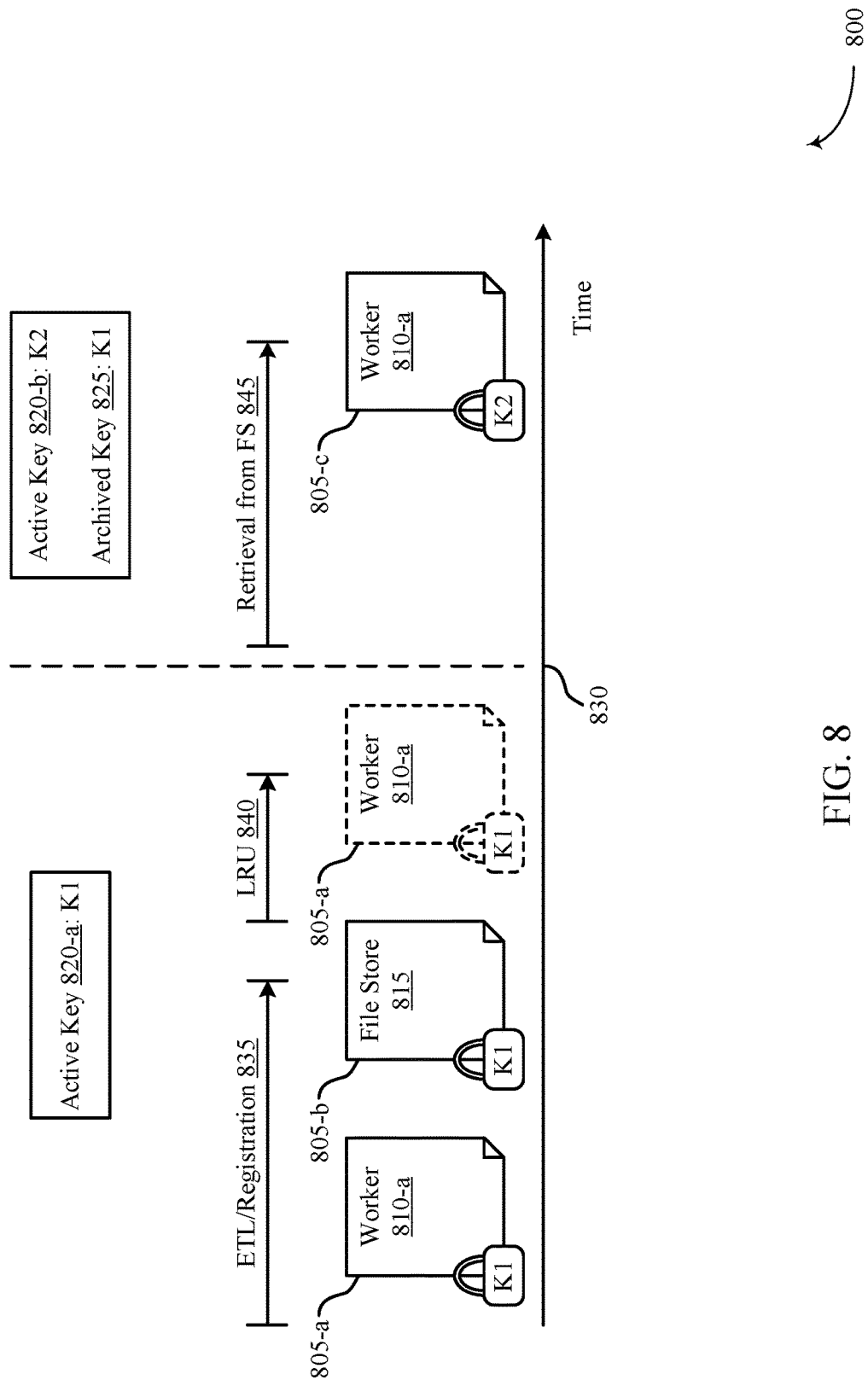

FIG. 8 illustrates an example of a key management timeline 800 for intercepting calls for encryption handling in persistent access multi-key systems in accordance with various aspects of the present disclosure. The key management timeline 800 may illustrate updating encryption following a page writeback from a worker 810 to the file store 815. Updating the encryption may be based on a key rotation process.

In one possible implementation, a system may perform an ETL job/registration process 835. During the ETL job, worker 810-a may write a dataset 805 to disk based on an encryption process. For example, worker 810-a may encrypt the dataset 805 using an active key 820, such as active key 820-a (e.g., K1), and may store encrypted dataset 805-a on its disk. Additionally, during the registration process, worker 810-a may register the dataset 805 on the file store 815. In some cases, the dataset 805 may be registered on the file store 815 using the same active key 820, resulting in encrypted dataset 805-b. Worker 810-a may keep encrypted dataset 805-a on disk for a certain amount of time for faster access. For example, if the system receives a query job for the dataset 805, the system may retrieve encrypted dataset 805-a from the filesystem for worker 810-a, rather than perform a retrieval process to get encrypted dataset 805-b from the file store 815. Retrieval of records from a worker 810 may take less time than retrieval from the file store 815, which may reduce latency.

After some time (e.g., based on a pre-determined amount of time or an amount of data written to disk for worker 810-a), worker 810-a may remove encrypted dataset 805-a from the disk. This removal may be based on an LRU removal process 840. In some cases, while performing the LRU removal process 840, the system may perform page writeback, and may update encrypted dataset 805-b stored at the file store 815 based on the encrypted dataset 805-a being removed.

At time 830, the system may undergo a key rotation process (e.g., based on a key rotation schedule, a user input, or some other key rotation trigger). The system may archive active key 820-a (e.g., K1), and may select new active key 820-b (e.g., K2). K1 may be added to a set of archived keys 825. Following time 830, worker 810-a may retrieve the dataset 805 on demand from the file store 815. For example, worker 810-a may process a query job corresponding to the dataset 805, and may perform a retrieval from the file store 845 in response to the query job.

Worker 810-a may store the dataset 805 on disk once again following the retrieval from the centralized file store 845. Worker 810-a may encrypt the dataset 805 using new active key 820-b. For example, worker 810-a may retrieve encrypted dataset 805-b from the file store 815, may decrypt encrypted dataset 805-b using the archived key 825 (e.g., K1) to obtain the dataset 805, and may re-encrypt the dataset 805 using new active key 820-b to obtain encrypted dataset 805-c. Worker 810-a may then store encrypted dataset 805-c on disk. In this way, the file store 815 may store a dataset 805 using a first encryption key, while worker 810-a may store the same dataset 805 using a second encryption key.

Figure 9:
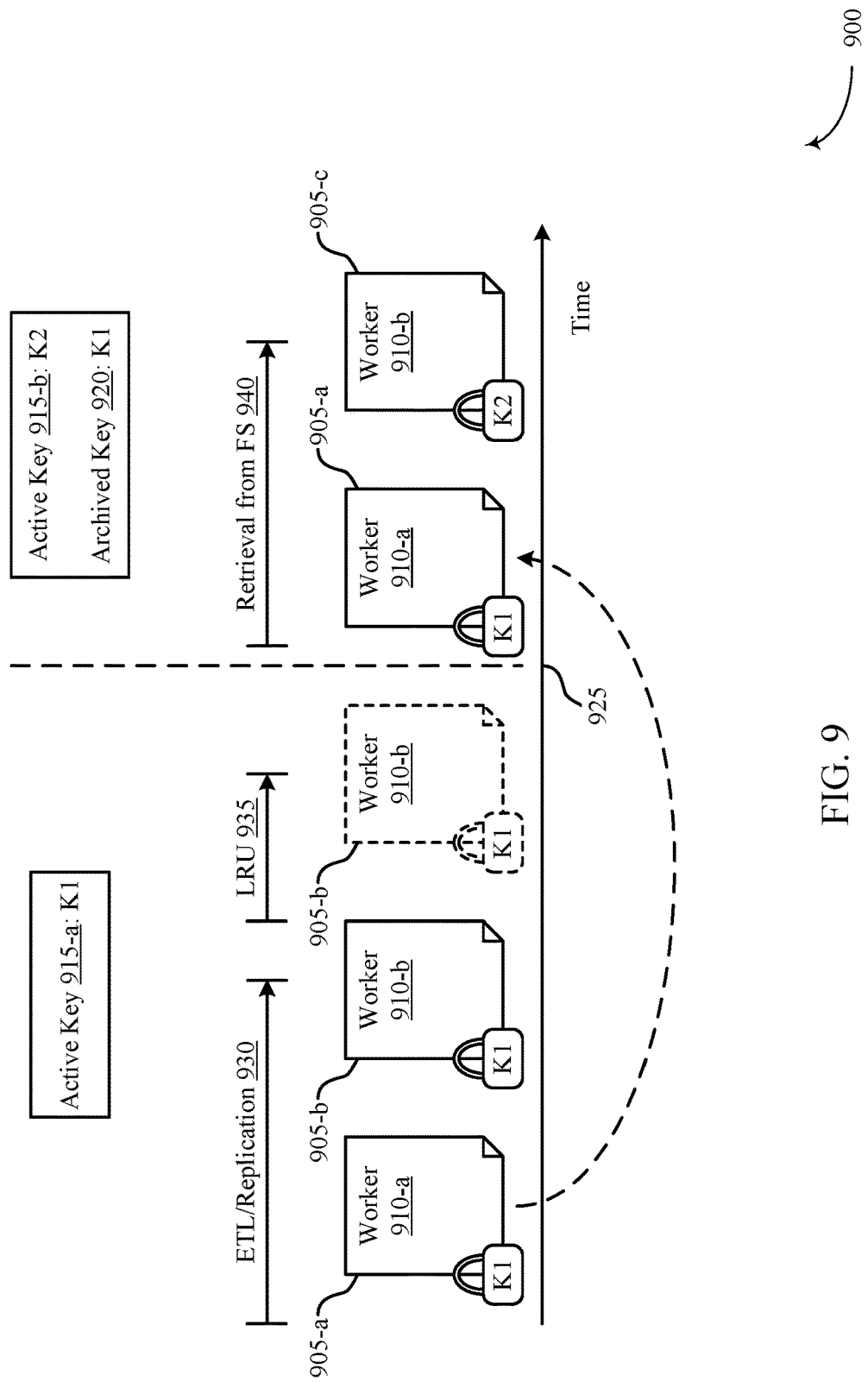

FIG. 9 illustrates an example of a key management timeline 900 for intercepting calls for encryption handling in persistent access multi-key systems in accordance with various aspects of the present disclosure. The key management timeline 900 may illustrate different workers 910 supporting a same tenant or user using different encryption keys to store a same dataset 905 on disk. The tenant may be part of a single tenant or multitenant system.

In one exemplary implementation, a system may perform an ETL/replication process 930. A first worker (e.g., worker 910-a) may perform an ETL job to generate a dataset 905. Worker 910-a may encrypt the dataset 905 using first active key 915-a (e.g., K1) to obtain encrypted dataset 905-a, and may store dataset 905-a on disk. Worker 910-a may then replicate the dataset 905 to a second worker 910 (e.g., second worker 910-b). In some cases, the replication process may involve second worker 910-a retrieving encrypted dataset 905-a from first worker 910-a, decrypting dataset 905-a using first active key 915-a, and performing some processing on the resulting dataset 905. Second worker 910-b may store the dataset 905 to disk by re-encrypting the dataset 905 using first active key 915-a, and storing resulting encrypted dataset 905-b to disk. In other cases, second worker 910-b may simply retrieve encrypted dataset 905-a from first worker 910-a, and store the retrieved encrypted dataset 905-a on disk.

At some later time, one of the workers 910 (e.g., second worker 910-b) may remove encrypted dataset 905-b from disk. For example, encrypted dataset 905-b may be removed based on an LRU process 935. In some cases, when removing encrypted dataset 905-b from disk, worker 910-b may update a version of the dataset 905 stored in a central database or file store (not pictured).

The system may undergo a key rotation process at time 925. First active key 915-a associated with the tenant for the dataset 905 may be archived, and second active key 915-b (e.g., K2) may be activated for the tenant. First active key 915-a (e.g., K1) may be archived as an archived key 920. Following the key rotation process, second worker 910-b may perform a retrieval from the file store 940 to fetch or peer-fetch the dataset 905 (e.g., based on a query job or some other on demand command). Second worker 910-b may identify second active key 915-b as the current active key 915, and may encrypt the dataset 905 using second active key 915-b to obtain encrypted dataset 905-c. Second worker 910-b may store encrypted dataset 905-c on disk. Meanwhile, first worker 910-a may not have removed encrypted dataset 905-a from its disk (e.g., first worker 910-a may have recently accessed the dataset 905, and accordingly may not have removed it during an LRU process). Therefore, first worker 910-a may continue to store encrypted dataset 905-a using first active key 915-a (e.g., now archived key 920). In this way, first worker 910-a and second worker 910-b may store the same dataset 905 on their respective disks using different encryption keys (e.g., K1 and K2, respectively).

Figure 10:
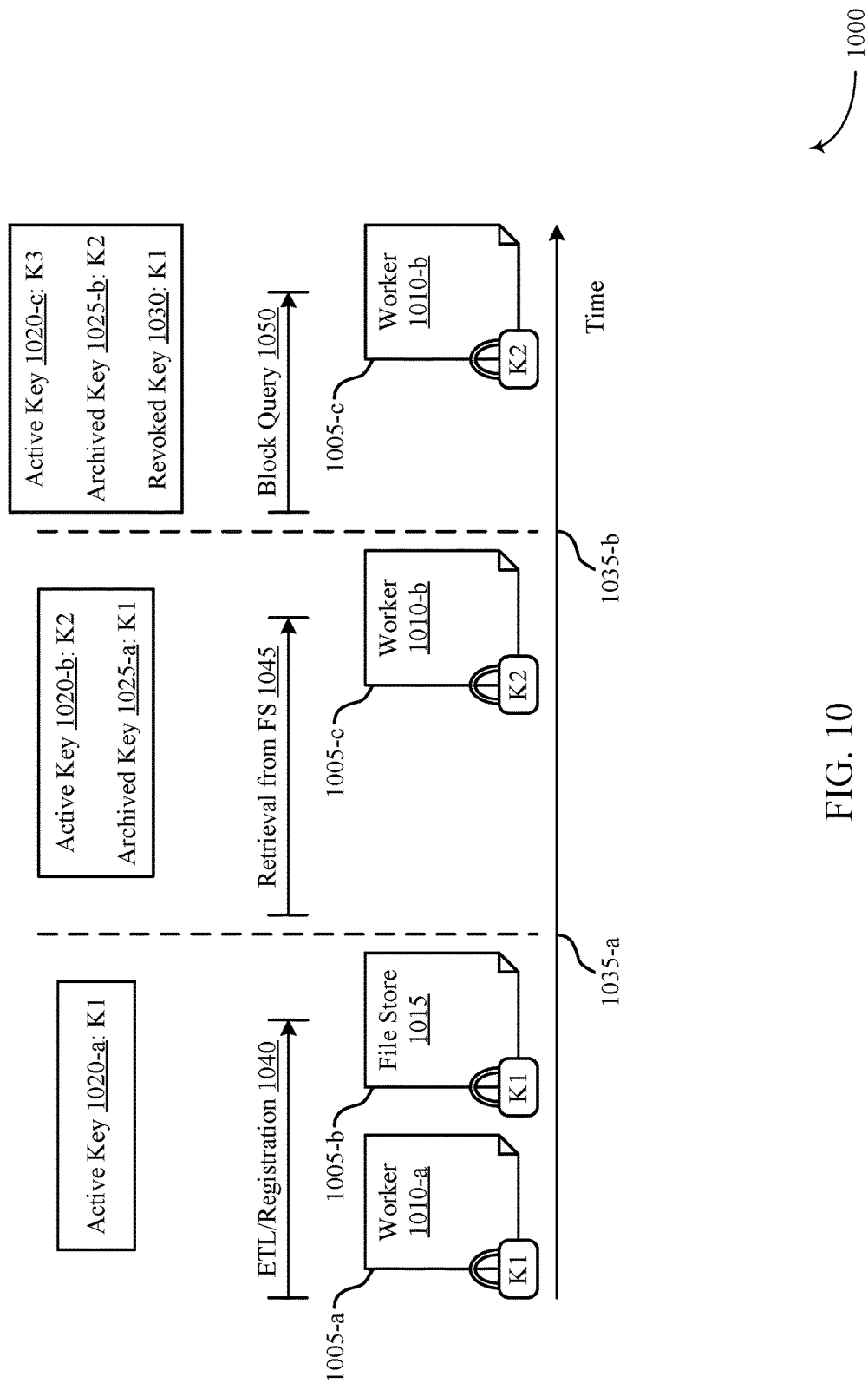

FIG. 10 illustrates an example of a key management timeline 1000 for intercepting calls for encryption handling in persistent access multi-key systems in accordance with various aspects of the present disclosure. The key management timeline 1000 may illustrate a key management system such as the ones described with reference to FIGS. 6 through 9. In such key management systems, encrypted data stored at different places (e.g., workers 1010, a centralized file store 1015, etc.) may not utilize synchronized encryption keys. Implementing asynchronous keys may result in some potential issues in a key management system. In one example, a record may be stored using different encryption keys at different places in the key management system. A tenant or user may revoke an encryption key associated with the record, and may expect all records generated during the time period when the revoked key was active to become unreadable based on revoking the key. However, the record may remain available for retrieval if it is cached somewhere else with an active key 1020 or archived key 1025. The key management timeline 1000 illustrates a solution for such a potential problem for asynchronous keys.

A first worker 1010 (e.g., first worker 1010-*a*) may perform an ETL/registration process 1040. For example, first worker 1010-*a* may generate a dataset 1005 based on an ETL job, and may encrypt the dataset 1005 using first active key 1020-*a* (e.g., K1). Along with the resulting dataset, encrypted dataset 1005-*a*, first worker 1010-*a* may include an indication, such as a key identifier, of first active key 1020-*a*. This indication may correspond to the active key 1020 at the time the dataset 1005 was generated. First worker 1010-*a* may store resulting encrypted dataset 1005-*a* on a disk, and may register the dataset 1005 to a file store 1015, where the dataset 1005 may once again be encrypted using an active key 1020 and stored as encrypted dataset 1005-*b* along with the indication of first active key 1020-*a*.

The key management system may perform a key rotation process at time 1035-*a*. During the key rotation process, first active key 1020-*a* may be archived (e.g., as archived key 1025-*a*), and second active key 1020-*b* (e.g., K2) may be activated. Following the key rotation process, a second worker 1010 (e.g., second worker 1010-*b*) may perform a retrieval process 1045 from the file store 1015 to fetch the dataset 1005. Second worker 1010-*b* may store the dataset 1005 on disk by encrypting the dataset 1005 using second active key 1020-*b*, and storing resulting encrypted dataset 1005-*c* along with an indication of first active key 1020-*a*. In this way, even though second worker 1010-*b* stores the dataset using second active key 1020-*b*, the key management system continues to track the encryption key active at the time the dataset 1005 was generated.

At time 1035-*b*, the key management system may revoke an encryption key. For example, a user or tenant may input a key revocation command for K1, or may revoke a tenant secret used to generate K1. Following this process, in some cases the key management system may include revoked key 1030, archived key 1025-*b*, and third active key 1020-*c*. In other cases, second active key 1020-*b* may remain active. Based on the revoked key 1030—K1—the key management system may revoke access to any records generated while K1 was the active encryption key. In some cases, this applies to encrypted data generated during the time period K1 was active. In other cases, this applies to both encrypted and non-encrypted data generated during the time period K1 was active. A periodic key cache refresh function may evict the revoked key 1030 from worker 1010 key caches and the file store 1015 key cache within a pre-determined amount of time.

For example, second worker 1010-*b* may receive a query for the dataset 1005 from a user. Second worker 1010-*b* may identify encrypted dataset 1005-*c* stored on disk using K2, which may be an archived key 1025, not a revoked key 1030. However, second worker 1010-*b* may identify the indication to first active key 1020-*a*, K1, stored with encrypted dataset 1005-*c*. Based on revoked key 1030 and the indication, second worker 1010-*b* may block the query 1050 and may not return the dataset 1005 in response to the query. In some cases, second worker 1010-*b* may instead return an indication to the user that access was revoked to the queried record. In this way, the key management system may check the encryption key used when creating a dataset 1005, rather than the encryption key used when fetching the dataset 1005, and may avoid accessing records that a user intended to revoke.

Figure 11:
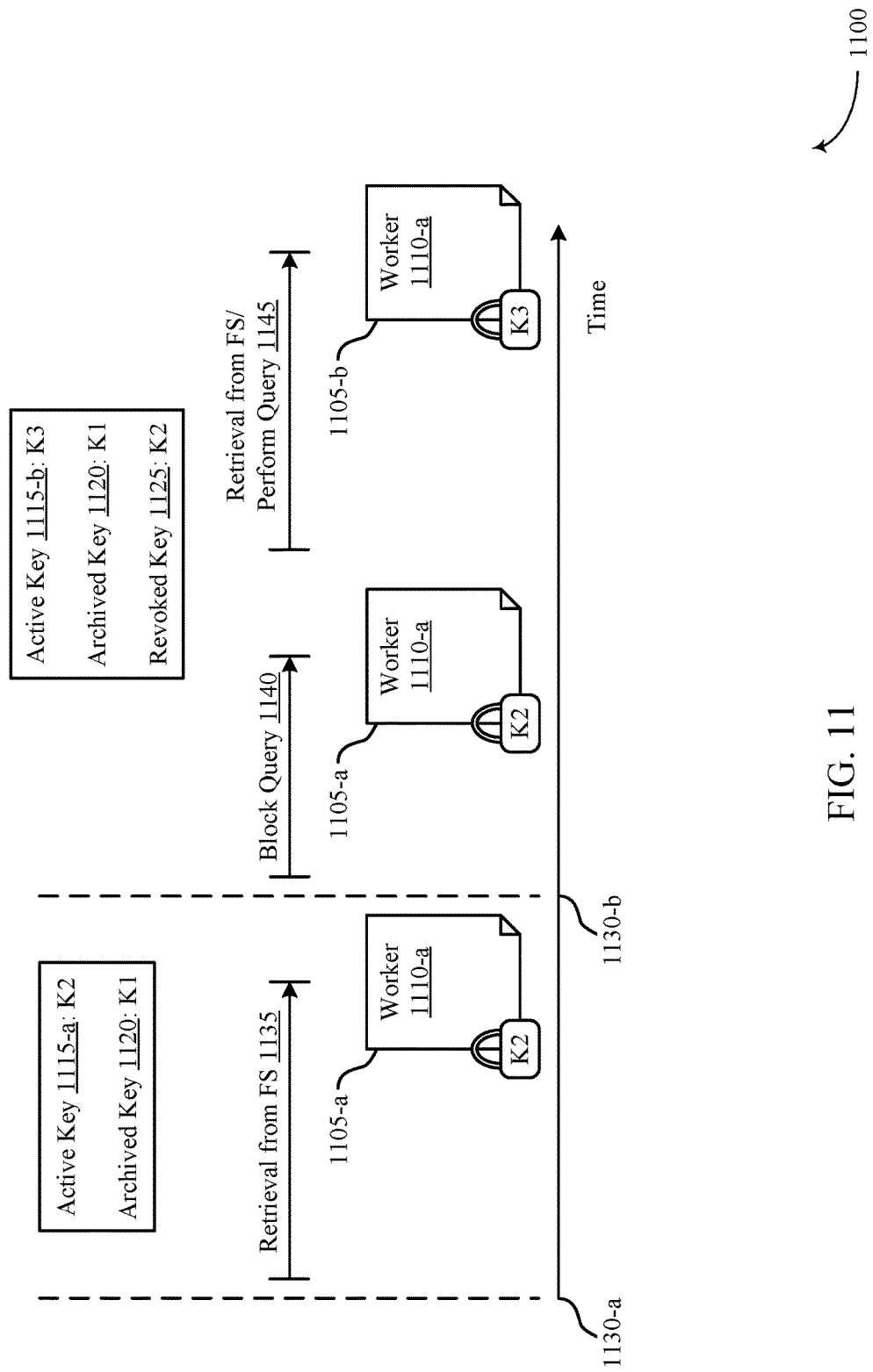

FIG. 11 illustrates an example of a key management timeline 1100 for intercepting calls for encryption handling in persistent access multi-key systems in accordance with various aspects of the present disclosure. The key management timeline 1100 may illustrate a key management system such as the ones described with reference to FIGS. 6 through 10. In such key management systems, encrypted data stored at different places (e.g., workers 1110, the centralized file store, etc.) may not utilize synchronized encryption keys. Implementing asynchronous keys may result in some potential issues in a key management system. In one example, a record may be stored using different encryption keys at different places in the key management system. A tenant or user may revoke an encryption key associated with the record cached at a specific worker 1110, which may be a different encryption key than the one used during generation of the record. However, if the worker 1110 processes a query job, the worker 1110 may block access to the record based on the user revoking access to that encryption key, despite the user intending just the records generated during the time period when the revoked key was active to become unreadable based on revoking the key. The key management timeline 1100 illustrates a solution for such a potential problem for asynchronous keys.

The key management timeline may illustrate an example implementation where a dataset 1105 is generated and encrypted using a first active encryption key (e.g., K1). The central file store may store the dataset 1105, along with an indication or identifier of the active encryption key at the time that the dataset 1105 was generated. At a later time 1130—such as time 1130-*a*—the system may perform a key rotation process. For example, a user may initiate the key rotation to archive the first encryption key (e.g., K1) as an archived key 1120, and may select or generate second active encryption key 1115-*a* (e.g., K2). Following this key rotation process, a worker 1110 (e.g., worker 1110-*a*) may perform a retrieval from the file store 1135 to fetch the dataset 1105. Worker 1110-*a* may encrypt the dataset 1105 using the currently active encryption key—that is, second active encryption key 1115-*a*—and may store resulting encrypted dataset 1105-*a* on disk, along with the identifier of the first active encrypted key.

At later time 1130-*b*, the system may perform a key revocation process, which in some cases may additionally include a key rotation process. For example, the system may revoke second active encryption key 1115-*a*, and may select or generate third active encryption key 1115-*b*. Following this process, worker 1110-*a* may receive a query job for the dataset 1110. Worker 1110-*a* may still locally cache encrypted dataset 1105-*a* on disk.

Worker 1110-*a* may identify that encrypted dataset 1105-*a* is encrypted using revoked encryption key 1125 (e.g., K2), and may block the query 1140. Rather than respond to the query with a "Could Not Decrypt" error, worker 1110-*a* may perform a false response. For example, worker 1110-*a* may respond with a "Dataset Not Found on Disk" error, which may be an example of a 404 error. In some cases, the system may respond with this false error based on identifying that the key identifier associated with encrypted dataset 1105-*a* was different than revoked encryption key 1125. In other cases, the system may respond with this false error message whenever a dataset 1105 is found locally cached using a revoked encryption key.

In response to the false error message, worker 1110-*a* may fetch the dataset 1105 from the file store. Worker 1110-*a* may encrypt the dataset 1105 using third active encryption key 1115-*b*, and may store resulting dataset 1105-*b*, along with the identifier of the first active encryption key, on disk locally. Worker 1110-*a* may also return the dataset 1105 or a portion of the dataset 1105 to the user in response to the query. For example, worker 1110-*a* may identify that the dataset 1105 is associated with the identifier of the first active encryption key, and may determine that the first active encryption key is not revoked. Based on this determination, worker 1110-*a* may respond to the query with the dataset 1105 or the portion of the dataset 1105. This retrieval from the file store and responding to the query 1145 may allow workers 1110 to replace encrypted datasets 1105 cached locally using revoked encryption keys 1125 with updated versions encrypted using an active encryption key 1115.

Figure 12:
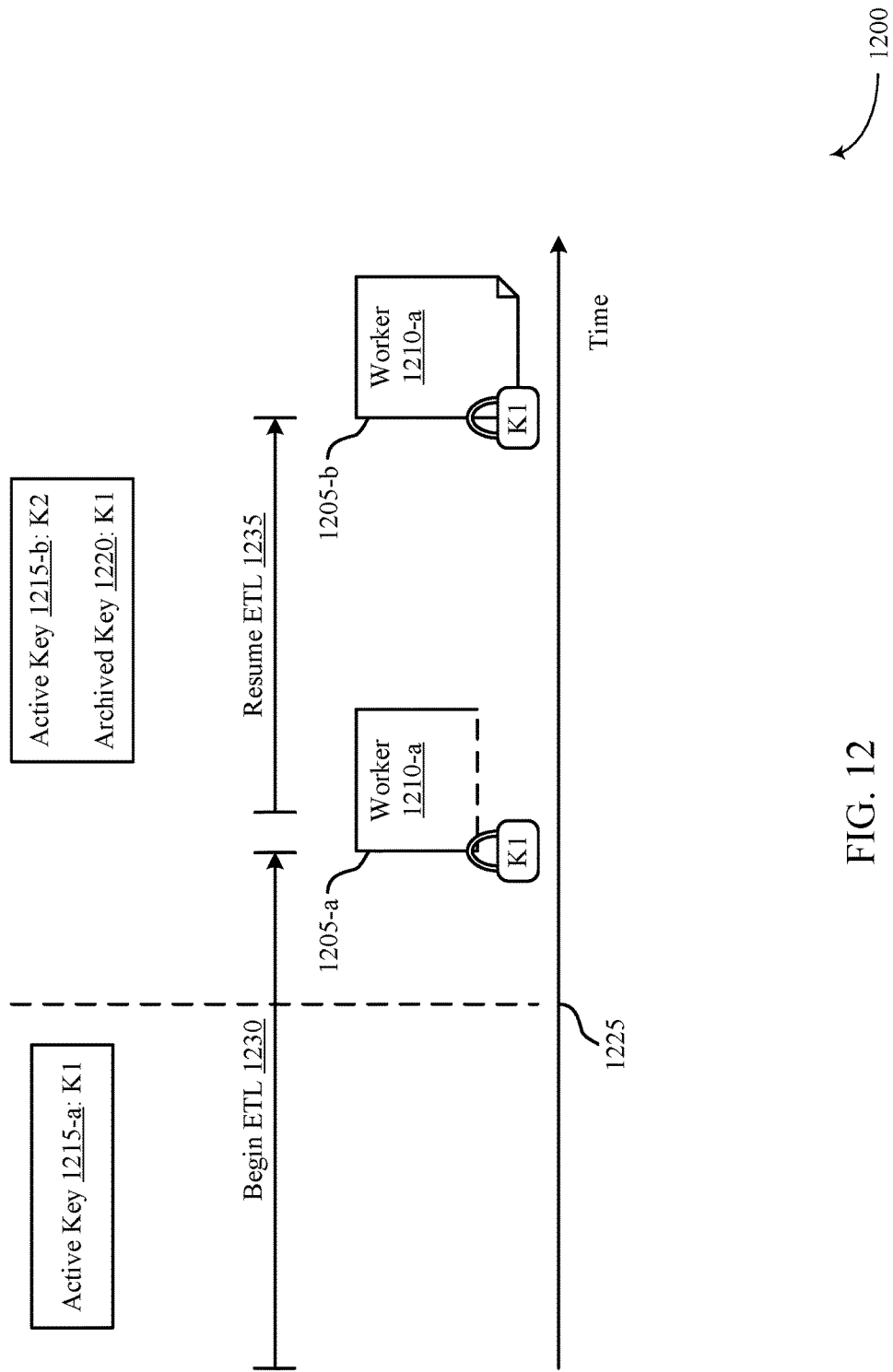

FIG. 12 illustrates an example of a key management timeline 1200 for intercepting calls for encryption handling in persistent access multi-key systems in accordance with various aspects of the present disclosure. The key management timeline 1200 may illustrate a key management system such as the ones described with reference to FIGS. 6 through 11. In such key management systems, worker reboots may result in potential issues. For example, if a worker 1210, implementing a Fuse driver, reboots during an ETL process and the key management system performs a key rotation process (e.g., based on a user or tenant input, or a predetermined key rotation periodicity) during the worker 1210 reboot, the worker 1210 may resume encrypting a dataset 1205 using a different encryption key than the worker 1210 used when starting the encrypting. Using different encryption keys for encrypting different portions of the dataset 1205 may result in an unreadable encrypted dataset 1205.

To avoid such potential issues, the key management system may store an identifier of the encryption key used for an ETL process at the start of the ETL process. For example, a worker (e.g., worker 1210-*a*) may begin an ETL process 1230 using active encryption key 1215-*a* (e.g., K1). Worker 1210-*a* may generate a file (e.g., a plain text file, such as origKey.txt) indicating active encryption key 1215-*a* at the beginning of the ETL process 1230. For example, generating the file may be the first step in performing the ETL process 1230. This generating the file may occur prior to worker 1210-*a* writing signature.json, which may also contain an indication of the active encryption key 1215. In this way, if the reboot occurs prior to writing signature.json, worker 1210-*a* may still contain an identifier of the active encryption key 1215.

In one exemplary embodiment, the key management system may perform a key rotation process at time 1225. During the key rotation process, the key management system may archive first active encryption key 1215-*a* (e.g., K1, as archived encryption key 1220), and may activate second active encryption key 1215-*b* (e.g., K2). At a later time, worker 1210-*a* may reboot, for example, based on a reboot periodicity or a reboot command. At the time of reboot, worker 1210-*a* may not have completed ETL process 1230, and may have partial encrypted dataset 1205-*a* encrypted using first active encryption key 1215-*a*.

Following the worker reboot, worker 1210-*a* may resume the ETL process 1235. Rather than use the current active encryption key 1215, worker 1210-*a* may check for a file indicating the active encryption key 1215 associated with the ETL processes 1230 and 1235. Worker 1210-*a* may identify the file indicating first active encryption key 1215-*a*. Based on the identification of the file, worker 1210-*a* may resume the ETL process 1235 using first active encryption key 1215-*a*, rather than the current active encryption key 1215-*b*. Worker 1210-*a* may start resuming the ETL process 1235 with partial encrypted dataset 1205-*a*, and may obtain encrypted dataset 1205-*b* using first active encryption key 1215-*a* (e.g., K1). In this way, worker 1210-*a* may handle key rotations during a worker reboot without restarting an ETL process or encrypting a dataset 1205 using more than one encryption key.

Figure 13:
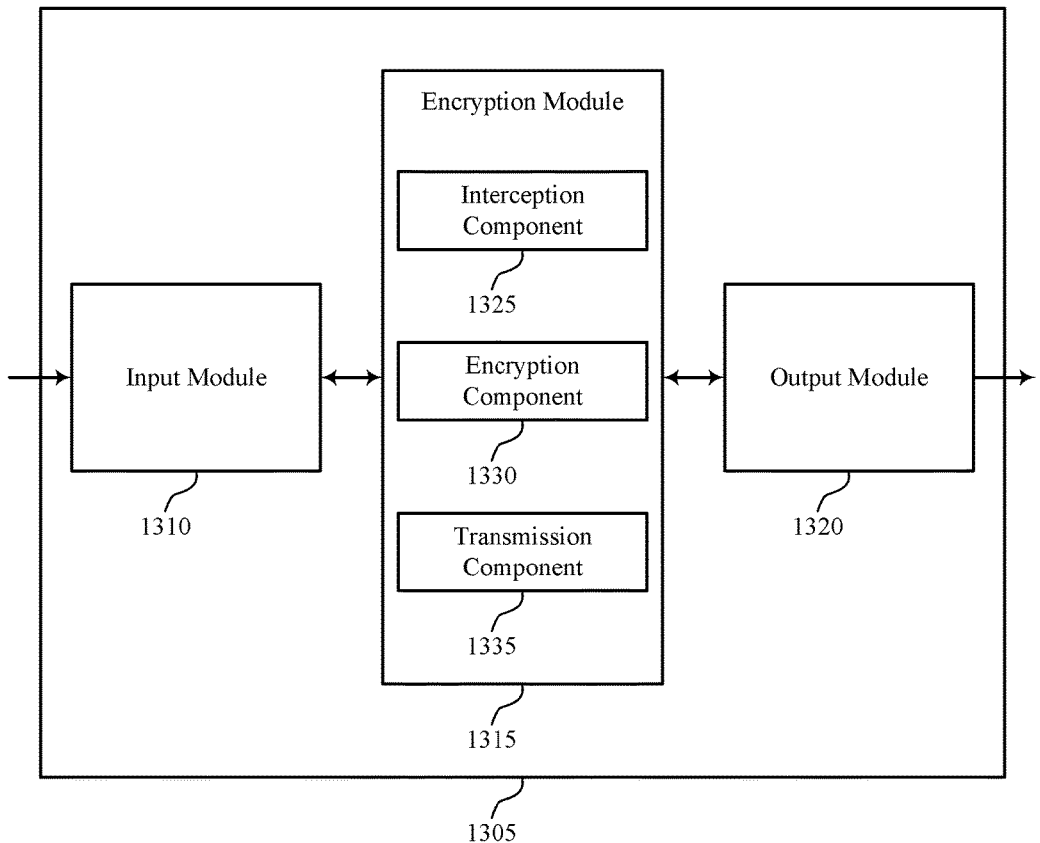
FIGS. 13 and 14 show block diagrams of a device that supports intercepting calls for encryption handling in persistent access multi-key systems in accordance with aspects of the present disclosure.

FIG. 13 shows a block diagram 1300 of an apparatus 1305 that supports intercepting calls for encryption handling in persistent access multi-key systems in accordance with aspects of the present disclosure. Apparatus 1305 may include input module 1310, encryption module 1315, and output module 1320. Apparatus 1305 may also include a processor. Each of these components may be in communication with one another (e.g., via one or more buses). In some cases, apparatus 1305 may be an example of a user terminal, a database server, or a system containing multiple computing devices.

Encryption module 1315 may be an example of aspects of the encryption module 1515 described with reference to FIG. 15. Encryption module 1315 may also include interception component 1325, encryption component 1330, and transmission component 1335.

Encryption module 1315 and/or at least some of its various sub-components may be implemented in hardware, software executed by a processor, firmware, or any combination thereof. If implemented in software executed by a processor, the functions of the encryption module 1315 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The encryption module 1315 and/or at least some of its various sub-components may be physically located at various positions, including being distributed such that portions of functions are implemented at different physical locations by one or more physical devices. In some examples, encryption module 1315 and/or at least some of its various sub-components may be a separate and distinct component in accordance with various aspects of the present disclosure. In other examples, encryption module 1315 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Interception component 1325 may intercept, at a device driver of a database server, a system call, where the database server includes a set of data sets associated with a set of encryption keys. In some cases, the system call includes a read command. In other cases, the system call includes a write command. In some cases, the device driver includes a FUSE driver. In some cases, the set of data sets are associated with a set of tenants.

Encryption component 1330 may perform, by the device driver, an encryption process on a data set of the set of data sets based on the system call and using an encryption key of the set of encryption keys. In some cases, the encryption process includes decrypting the data set based on the encryption key. In other cases, the encryption process includes encrypting the data set based on the encryption key.

Transmission component 1335 may transmit, from the device driver, a version of the data set based on the encryption process. In some cases, the version of the data set includes plaintext associated with the data set. The version of the data set may be transmitted to a user interface. In other cases, the version of the data set includes ciphertext associated with the data set. The version of the data set may be transmitted to a disk of the database server.

Figure 14:
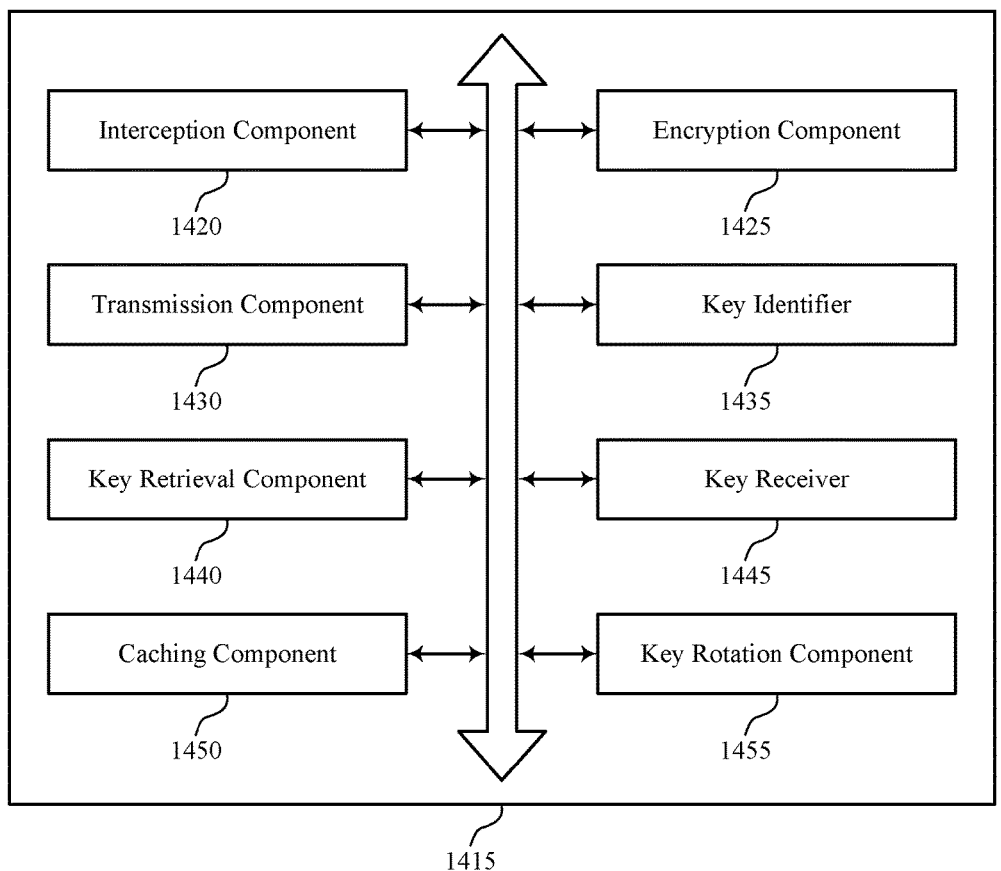

FIG. 14 shows a block diagram 1400 of an encryption module 1415 that supports intercepting calls for encryption handling in persistent access multi-key systems in accordance with aspects of the present disclosure. The encryption module 1415 may be an example of aspects of an encryption module 1315 or 1515 as described with reference to FIGS. 13 and 15. The encryption module 1415 may include interception component 1420, encryption component 1425, transmission component 1430, key identifier 1435, key retrieval component 1440, key receiver 1445, caching component 1450, and key rotation component 1455. Each of these modules may communicate, directly or indirectly, with one another (e.g., via one or more buses).

Interception component 1420 may intercept, at a device driver of a database server, a system call, where the database server includes a set of data sets associated with a set of encryption keys. In some cases, the system call includes a read command. In other cases, the system call includes a write command. In some cases, the device driver includes a FUSE driver. In some cases, the set of data sets are associated with a set of tenants.

Encryption component 1425 may perform, by the device driver, an encryption process on a data set of the set of data sets based on the system call and using an encryption key of the set of encryption keys. In some cases, the encryption process includes decrypting the data set based on the encryption key. In other cases, the encryption process includes encrypting the data set based on the encryption key. In some cases, the encryption key is an archived version of the encryption key.

Transmission component 1430 may transmit, from the device driver, a version of the data set based on the encryption process. In some cases, the version of the data set includes plaintext associated with the data set. The version of the data set may be transmitted to a user interface. In other cases, the version of the data set includes ciphertext associated with the data set. The version of the data set may be transmitted to a disk of the database server.

Key identifier 1435 may determine an identifier for the encryption key associated with the data set. Key retrieval component 1440 may transmit a request for the encryption key based on the identifier for the encryption key and may receive the encryption key from a key cache or an application server based on the transmitted request.

Key receiver 1445 may receive the encryption key with the system call. Caching component 1450 may store an identifier of the encryption key in a key cache.

Key rotation component 1455 may receive an indication of a rotated version of the encryption key, may decrypt the data set using the archived version of the encryption key, and may encrypt the data set using the rotated version of the encryption key.

Figure 15:
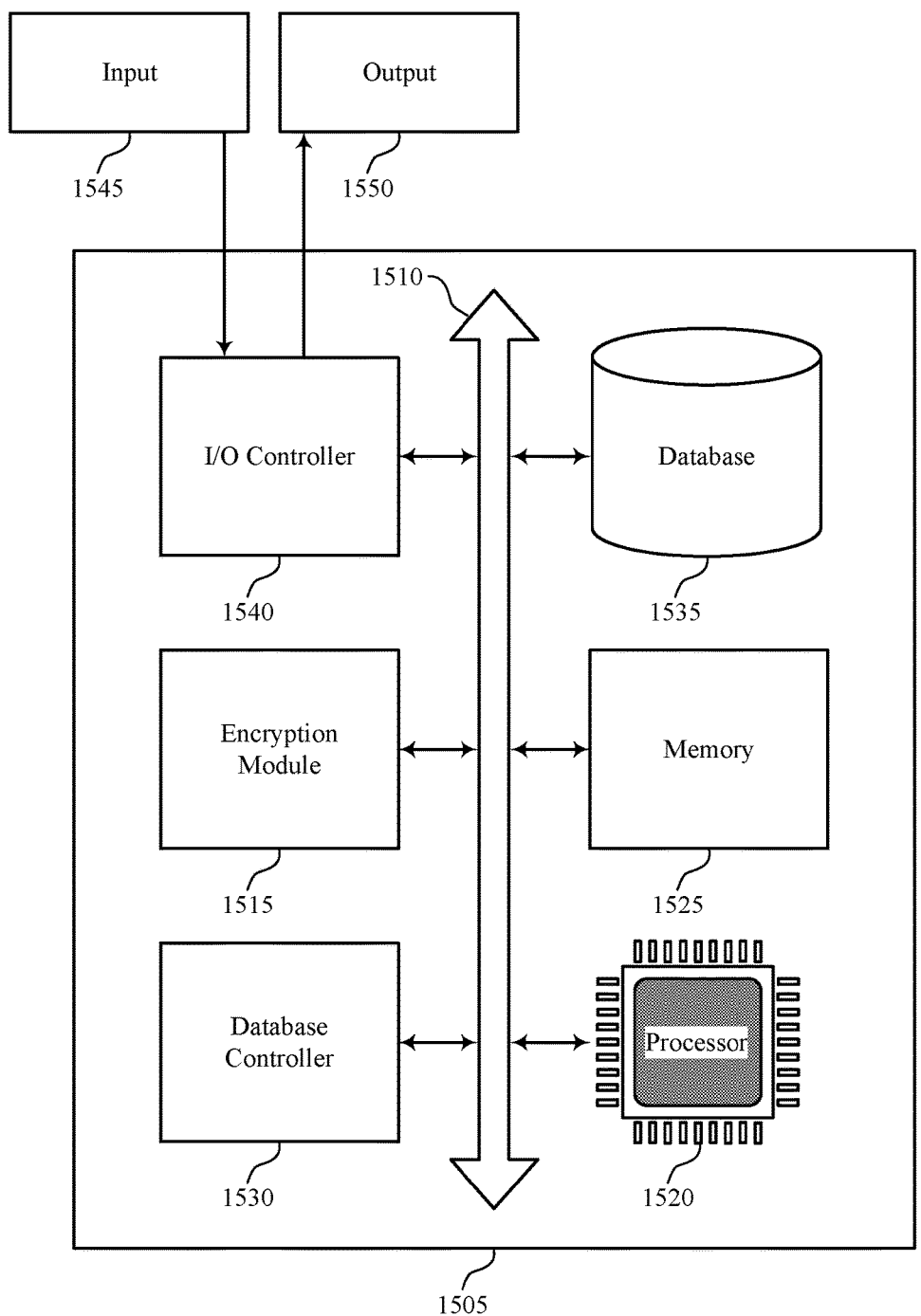
FIG. 15 illustrates a block diagram of a system including a worker that supports intercepting calls for encryption handling in persistent access multi-key systems in accordance with aspects of the present disclosure.

FIG. 15 shows a diagram of a system 1500 including a device 1505 that supports intercepting calls for encryption handling in persistent access multi-key systems in accordance with aspects of the present disclosure. Device 1505 may be an example of or include the components of a worker (e.g., a worker 355), which may be an example of or a component of a cloud client 105, a cloud platform 115, or a data center 120 as described above, e.g., with reference to FIG. 1. Device 1505 may include components for bi-directional data communications including components for transmitting and receiving communications, including encryption module 1515, processor 1520, memory 1525, database controller 1530, database 1535, and I/O controller 1540. These components may be in electronic communication via one or more buses (e.g., bus 1510).

Processor 1520 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1520 may be configured to operate a memory array using a memory controller. In other cases, a memory controller may be integrated into processor 1520. Processor 1520 may be configured to execute computer-readable instructions stored in a memory to perform various functions (e.g., functions or tasks supporting intercepting calls for encryption handling in persistent access multi-key systems).

Memory 1525 may include random access memory (RAM) and read only memory (ROM). The memory 1525 may store computer-readable, computer-executable software 1530 including instructions that, when executed, cause the processor to perform various functions described herein. In some cases, the memory 1525 may contain, among other things, a basic input/output system (BIOS) which may control basic hardware or software operation such as the interaction with peripheral components or devices.

Database controller 1530 may manage data storage and processing in database 1535. In some cases, a user may interact with database controller 1530. In other cases, database controller 1530 may operate automatically without user interaction. Database 1535 may be an example of a single database, a distributed database, multiple distributed databases, or an emergency backup database.

I/O controller 1540 may manage input and output signals for device 1505. P/O controller 1540 may also manage peripherals not integrated into device 1505. In some cases, I/O controller 1540 may represent a physical connection or port to an external peripheral. In some cases, I/O controller 1540 may utilize an operating system such as iOS®, ANDROID®, MS-DOS®, MS-WINDOWS®, OS/2®, UNIX®, LINUX®, or another known operating system. In other cases, I/O controller 1540 may represent or interact with a modem, a keyboard, a mouse, a touchscreen, or a similar device. In some cases, I/O controller 1540 may be implemented as part of a processor. In some cases, a user may interact with device 1505 via I/O controller 1540 or via hardware components controlled by I/O controller 1540.

Figure 16:
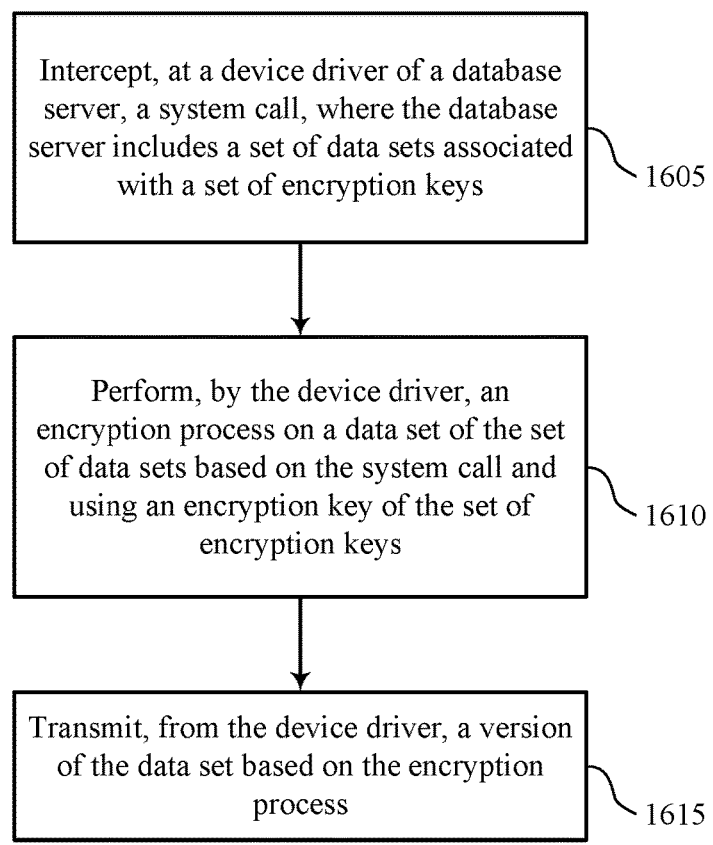
FIGS. 16 through 19 illustrate methods for intercepting calls for encryption handling in persistent access multi-key systems in accordance with aspects of the present disclosure.

FIG. 16 shows a flowchart illustrating a method 1600 for intercepting calls for encryption handling in persistent access multi-key systems in accordance with aspects of the present disclosure. The operations of method 1600 may be implemented by a worker—such as a worker as described with reference to FIGS. 2, 3, and 6 through 12—or its components as described herein. For example, the operations of method 1600 may be performed by an encryption module as described with reference to FIGS. 13 through 15. In some examples, a worker may execute a set of codes to control the functional elements of the device to perform the functions described below. Additionally or alternatively, the worker may perform aspects of the functions described below using special-purpose hardware.

At block 1605 the worker may intercept, at a device driver of a database server, a system call, wherein the database server comprises a plurality of data sets associated with a plurality of encryption keys. The operations of block 1605 may be performed according to the methods described herein. In certain examples, aspects of the operations of block 1605 may be performed by an interception component as described with reference to FIGS. 13 through 15.

At block 1610 the worker may perform, by the device driver, an encryption process on a data set of the plurality of data sets based at least in part on the system call and using an encryption key of the plurality of encryption keys. The operations of block 1610 may be performed according to the methods described herein. In certain examples, aspects of the operations of block 1610 may be performed by an encryption component as described with reference to FIGS. 13 through 15.

At block 1615 the worker may transmit, from the device driver, a version of the data set based at least in part on the encryption process. The operations of block 1615 may be performed according to the methods described herein. In certain examples, aspects of the operations of block 1615 may be performed by a transmission component as described with reference to FIGS. 13 through 15.

Figure 17:
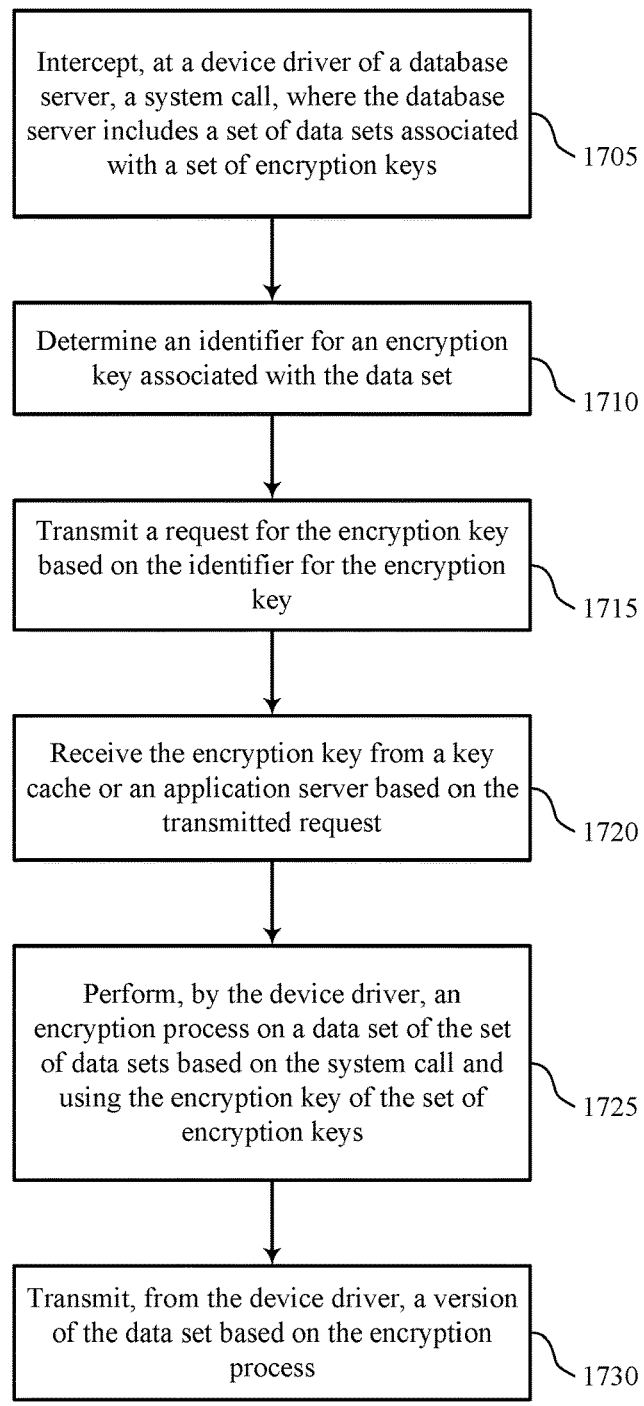

FIG. 17 shows a flowchart illustrating a method 1700 for intercepting calls for encryption handling in persistent access multi-key systems in accordance with aspects of the present disclosure. The operations of method 1700 may be implemented by a worker—such as a worker as described with reference to FIGS. 2, 3, and 6 through 12—or its components as described herein. For example, the operations of method 1700 may be performed by an encryption module as described with reference to FIGS. 13 through 15. In some examples, a worker may execute a set of codes to control the functional elements of the device to perform the functions described below. Additionally or alternatively, the worker may perform aspects of the functions described below using special-purpose hardware.

At block 1705 the worker may intercept, at a device driver of a database server, a system call, wherein the database server comprises a plurality of data sets associated with a plurality of encryption keys. The system call may be an example of a read command. The operations of block 1705 may be performed according to the methods described herein. In certain examples, aspects of the operations of block 1705 may be performed by an interception component as described with reference to FIGS. 13 through 15.

At block 1710 the worker may determine an identifier for the encryption key associated with the data set. The operations of block 1710 may be performed according to the methods described herein. In certain examples, aspects of the operations of block 1710 may be performed by a key identifier as described with reference to FIGS. 13 through 15.

At block 1715 the worker may transmit a request for the encryption key based at least in part on the identifier for the encryption key. The operations of block 1715 may be performed according to the methods described herein. In certain examples, aspects of the operations of block 1715 may be performed by a key retrieval component as described with reference to FIGS. 13 through 15.

At block 1720 the worker may receive the encryption key from a key cache or an application server based at least in part on the transmitted request. The operations of block 1720 may be performed according to the methods described herein. In certain examples, aspects of the operations of block 1720 may be performed by a key retrieval component as described with reference to FIGS. 13 through 15.

At block 1725 the worker may perform, by the device driver, an encryption process on a data set of the plurality of data sets based at least in part on the system call and using an encryption key of the plurality of encryption keys. The encryption process may include decrypting the data set based on the encryption key. The operations of block 1725 may be performed according to the methods described herein. In certain examples, aspects of the operations of block 1725 may be performed by an encryption component as described with reference to FIGS. 13 through 15.

At block 1730 the worker may transmit, from the device driver, a version of the data set based at least in part on the encryption process. The version of the data set may contain plaintext corresponding to the data set. The operations of block 1730 may be performed according to the methods described herein. In certain examples, aspects of the operations of block 1730 may be performed by a transmission component as described with reference to FIGS. 13 through 15.

Figure 18:
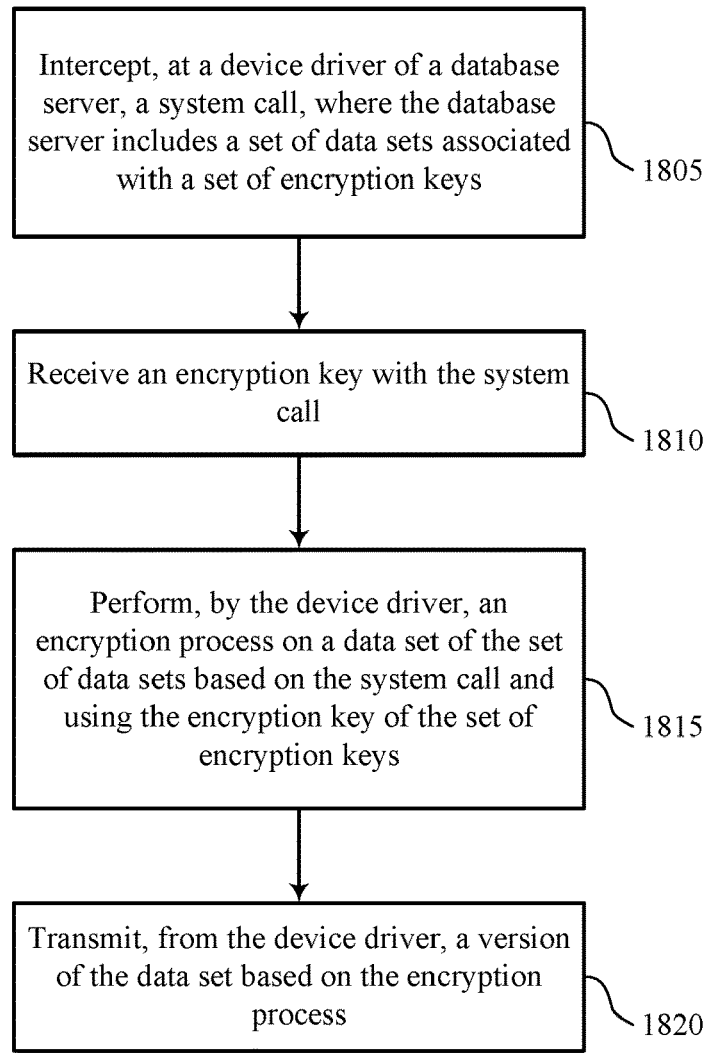

FIG. 18 shows a flowchart illustrating a method 1800 for intercepting calls for encryption handling in persistent access multi-key systems in accordance with aspects of the present disclosure. The operations of method 1800 may be implemented by a worker—such as a worker as described with reference to FIGS. 2, 3, and 6 through 12—or its components as described herein. For example, the operations of method 1800 may be performed by an encryption module as described with reference to FIGS. 13 through 15. In some examples, a worker may execute a set of codes to control the functional elements of the device to perform the functions described below. Additionally or alternatively, the worker may perform aspects of the functions described below using special-purpose hardware.

At block 1805 the worker may intercept, at a device driver of a database server, a system call, wherein the database server comprises a plurality of data sets associated with a plurality of encryption keys. The system call may be an example of a write command. The operations of block 1805 may be performed according to the methods described herein. In certain examples, aspects of the operations of block 1805 may be performed by an interception component as described with reference to FIGS. 13 through 15.

At block 1810 the worker may receive an encryption key with the system call. The operations of block 1810 may be performed according to the methods described herein. In certain examples, aspects of the operations of block 1810 may be performed by a key receiver as described with reference to FIGS. 13 through 15.

At block 1815 the worker may perform, by the device driver, an encryption process on a data set of the plurality of data sets based at least in part on the system call and using the encryption key of the plurality of encryption keys. The encryption process may include encrypting the data set based on the encryption key. The operations of block 1815 may be performed according to the methods described herein. In certain examples, aspects of the operations of block 1815 may be performed by an encryption component as described with reference to FIGS. 13 through 15.

At block 1820 the worker may transmit, from the device driver, a version of the data set based at least in part on the encryption process. The version of the data set may contain ciphertext corresponding to the data set. The operations of block 1820 may be performed according to the methods described herein. In certain examples, aspects of the operations of block 1820 may be performed by a transmission component as described with reference to FIGS. 13 through 15.

Figure 19:
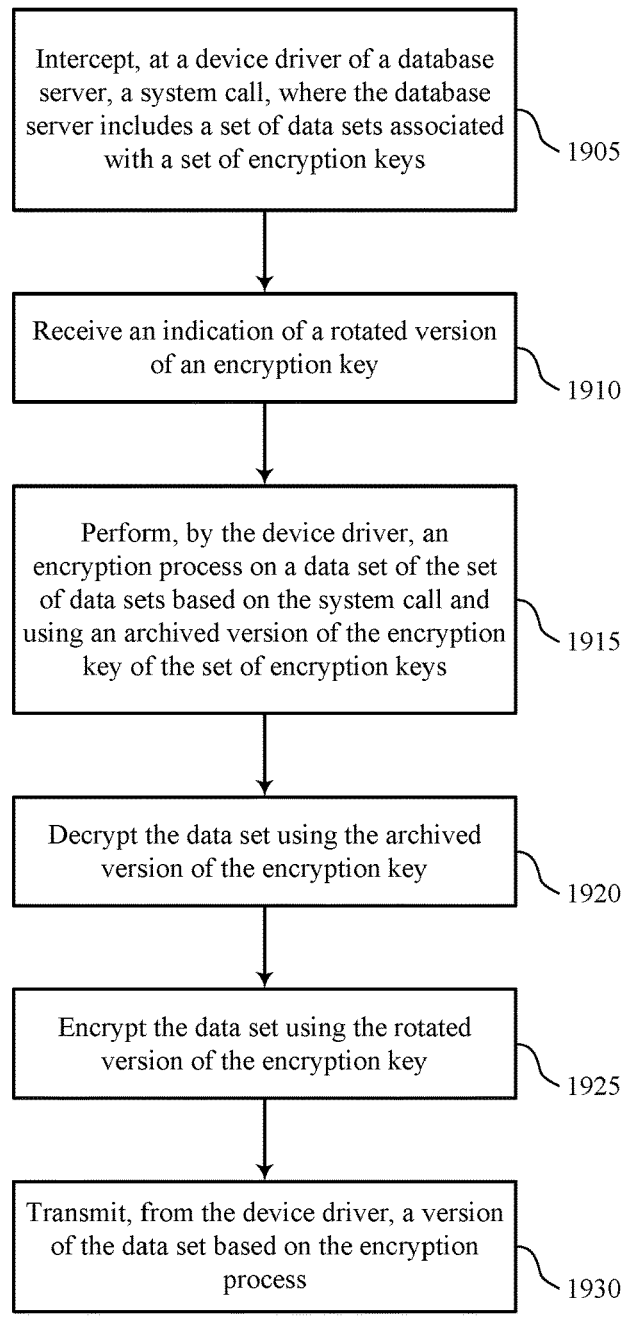

FIG. 19 shows a flowchart illustrating a method 1900 for intercepting calls for encryption handling in persistent access multi-key systems in accordance with aspects of the present disclosure. The operations of method 1900 may be implemented by a worker—such as a worker as described with reference to FIGS. 2, 3, and 6 through 12—or its components as described herein. For example, the operations of method 1900 may be performed by an encryption module as described with reference to FIGS. 13 through 15. In some examples, a worker may execute a set of codes to control the functional elements of the device to perform the functions described below. Additionally or alternatively, the worker may perform aspects of the functions described below using special-purpose hardware.

At block 1905 the worker may intercept, at a device driver of a database server, a system call, wherein the database server comprises a plurality of data sets associated with a plurality of encryption keys. The operations of block 1905 may be performed according to the methods described herein. In certain examples, aspects of the operations of block 1905 may be performed by an interception component as described with reference to FIGS. 13 through 15.

At block 1910 the worker may receive an indication of a rotated version of an encryption key. The operations of block 1910 may be performed according to the methods described herein. In certain examples, aspects of the operations of block 1910 may be performed by a key rotation component as described with reference to FIGS. 13 through 15.

At block 1915 the worker may perform, by the device driver, an encryption process on a data set of the plurality of data sets based at least in part on the system call and using an encryption key of the plurality of encryption keys. The encryption key may be an archived version of the encryption key. The operations of block 1915 may be performed according to the methods described herein. In certain examples, aspects of the operations of block 1915 may be performed by an encryption component as described with reference to FIGS. 13 through 15.

At block 1920 the worker may decrypt the data set using the archived version of the encryption key. The operations of block 1920 may be performed according to the methods described herein. In certain examples, aspects of the operations of block 1920 may be performed by a key rotation component as described with reference to FIGS. 13 through 15.

At block 1925 the worker may encrypt the data set using the rotated version of the encryption key. The operations of block 1925 may be performed according to the methods described herein. In certain examples, aspects of the operations of block 1925 may be performed by a key rotation component as described with reference to FIGS. 13 through 15.

At block 1930 the worker may transmit, from the device driver, a version of the data set based at least in part on the encryption process. The operations of block 1930 may be performed according to the methods described herein. In certain examples, aspects of the operations of block 1930 may be performed by a transmission component as described with reference to FIGS. 13 through 15.

A method of encryption management is described. The method may include intercepting, at a device driver of a database server, a system call, wherein the database server comprises a plurality of data sets associated with a plurality of encryption keys. The method may include performing, by the device driver, an encryption process on a data set of the plurality of data sets based at least in part on the system call and using an encryption key of the plurality of encryption keys. The method may further include transmitting, from the device driver, a version of the data set based at least in part on the encryption process.

An apparatus for encryption management is described. The apparatus may include a processor, memory in electronic communication with the processor, and instructions stored in the memory. The instructions may be operable to cause the processor to intercept, at a device driver of a database server, a system call, wherein the database server comprises a plurality of data sets associated with a plurality of encryption keys. The instructions may be operable to cause the processor to perform, by the device driver, an encryption process on a data set of the plurality of data sets based at least in part on the system call and using an encryption key of the plurality of encryption keys. The instructions may further be operable to cause the processor to transmit, from the device driver, a version of the data set based at least in part on the encryption process.

A non-transitory computer readable medium for encryption management is described. The non-transitory computer-readable medium may include instructions operable to cause a processor to intercept, at a device driver of a database server, a system call, wherein the database server comprises a plurality of data sets associated with a plurality of encryption keys. The instructions may be operable to cause the processor to perform, by the device driver, an encryption process on a data set of the plurality of data sets based at least in part on the system call and using an encryption key of the plurality of encryption keys. The instructions may be further operable to cause the processor to transmit, from the device driver, a version of the data set based at least in part on the encryption process.

In some examples of the method, apparatus, and non-transitory computer-readable medium described above, the system call comprises a read command. In some examples of the method, apparatus, and non-transitory computer-readable medium described above, the encryption process comprises decrypting the data set based at least in part on the encryption key. In some examples of the method, apparatus, and non-transitory computer-readable medium described above, the version of the data set comprises plaintext associated with the data set.

Some examples of the method, apparatus, and non-transitory computer-readable medium described above may further include processes, features, means, or instructions for determining an identifier for the encryption key associated with the data set. Some examples of the method, apparatus, and non-transitory computer-readable medium described above may further include processes, features, means, or instructions for transmitting a request for the encryption key based at least in part on the identifier for the encryption key.

Some examples of the method, apparatus, and non-transitory computer-readable medium described above may further include processes, features, means, or instructions for receiving the encryption key from a key cache or an application server based at least in part on the transmitted request.

In some examples of the method, apparatus, and non-transitory computer-readable medium described above, the version of the data set may be transmitted to a user interface.

In some examples of the method, apparatus, and non-transitory computer-readable medium described above, the system call comprises a write command. In some examples of the method, apparatus, and non-transitory computer-readable medium described above, the encryption process comprises encrypting the data set based at least in part on the encryption key. In some examples of the method, apparatus, and non-transitory computer-readable medium described above, the version of the data set comprises ciphertext associated with the data set.

Some examples of the method, apparatus, and non-transitory computer-readable medium described above may further include processes, features, means, or instructions for receiving the encryption key with the system call.

Some examples of the method, apparatus, and non-transitory computer-readable medium described above may further include processes, features, means, or instructions for storing an identifier of the encryption key in a key cache.

In some examples of the method, apparatus, and non-transitory computer-readable medium described above, the version of the data set may be transmitted to a disk of the database server.

In some examples of the method, apparatus, and non-transitory computer-readable medium described above, the encryption key may be an archived version of the encryption key. Some examples of the method, apparatus, and non-transitory computer-readable medium described above may further include processes, features, means, or instructions for receiving an indication of a rotated version of the encryption key. Some examples of the method, apparatus, and non-transitory computer-readable medium described above may further include processes, features, means, or instructions for decrypting the data set using the archived version of the encryption key. Some examples of the method, apparatus, and non-transitory computer-readable medium described above may further include processes, features, means, or instructions for encrypting the data set using the rotated version of the encryption key.

In some examples of the method, apparatus, and non-transitory computer-readable medium described above, the device driver comprises a FUSE driver. In some examples of the method, apparatus, and non-transitory computer-readable medium described above, the plurality of data sets may be associated with a plurality of tenants.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for encryption management, comprising:
    intercepting, at a device driver of a database server, a system call, wherein the database server comprises a plurality of data sets associated with a plurality of encryption keys;
    performing, by the device driver, an encryption process on a data set of the plurality of data sets based at least in part on the system call and using a first version of an encryption key of the plurality of encryption keys;
    transmitting, from the device driver, a version of the data set based at least in part on the encryption process;
    receiving an indication of a rotated version of the encryption key, wherein the first version of the encryption key comprises an archived version of the encryption key;
    decrypting the data set using the archived version of the encryption key; and
    encrypting the data set using the rotated version of the encryption key.

2. The method of claim 1, wherein:
    the system call comprises a read command;
    the encryption process comprises decrypting the data set based at least in part on the encryption key; and
    the version of the data set comprises plaintext associated with the data set.

3. The method of claim 2, further comprising:
    determining an identifier for the encryption key associated with the data set; and
    transmitting a request for the encryption key based at least in part on the identifier for the encryption key.

4. The method of claim 3, further comprising:
    receiving the encryption key from a key cache or an application server based at least in part on the transmitted request.

5. The method of claim 3, wherein the version of the data set is transmitted to a user interface.

6. The method of claim 1, wherein:
    the system call comprises a write command;
    the encryption process comprises encrypting the data set based at least in part on the encryption key; and
    the version of the data set comprises ciphertext associated with the data set.

7. The method of claim 6, further comprising:
    receiving the encryption key with the system call.

8. The method of claim 7, further comprising:
    storing an identifier of the encryption key in a key cache.

9. The method of claim 6, wherein the version of the data set is transmitted to a disk of the database server.

10. The method of claim 1, wherein:
    the database server comprises a plurality of worker servers managing the plurality of data sets; and
    a first worker server of the plurality of worker servers stores the data set encrypted using the archived version of the encryption key while a second worker server of the plurality of worker servers stores the data set encrypted using the rotated version of the encryption key.

11. The method of claim 1, wherein the device driver comprises a file system in user space (FUSE) driver.

12. The method of claim 1, wherein the plurality of data sets are associated with a plurality of tenants.

13. An apparatus for encryption management, comprising:
    a processor;
    memory in electronic communication with the processor; and
    instructions stored in the memory and operable, when executed by the processor, to cause the apparatus to:
        intercept, at a device driver of a database server, a system call, wherein the database server comprises a plurality of data sets associated with a plurality of encryption keys;
        perform, by the device driver, an encryption process on a data set of the plurality of data sets based at least in part on the system call and using a first version of an encryption key of the plurality of encryption keys;
        transmit, from the device driver, a version of the data set based at least in part on the encryption process;
        receive an indication of a rotated version of the encryption key, wherein the first version of the encryption key comprises an archived version of the encryption key;
        decrypt the data set using the archived version of the encryption key; and
        encrypt the data set using the rotated version of the encryption key.

14. The apparatus of claim 13, wherein:
    the system call comprises a read command;
    the encryption process comprises decrypting the data set based at least in part on the encryption key; and
    the version of the data set comprises plaintext associated with the data set.

15. The apparatus of claim 14, wherein the instructions are further executable by the processor to:
    determine an identifier for the encryption key associated with the data set; and
    transmit a request for the encryption key based at least in part on the identifier for the encryption key.

16. The apparatus of claim 13, wherein:
    the system call comprises a write command;
    the encryption process comprises encrypting the data set based at least in part on the encryption key; and
    the version of the data set comprises ciphertext associated with the data set.

17. A non-transitory computer readable medium storing code for encryption management, the code comprising instructions executable by a processor to:
    intercept, at a device driver of a database server, a system call, wherein the database server comprises a plurality of data sets associated with a plurality of encryption keys;
    perform, by the device driver, an encryption process on a data set of the plurality of data sets based at least in part on the system call and using a first version of an encryption key of the plurality of encryption keys;
    transmit, from the device driver, a version of the data set based at least in part on the encryption process;
    receive an indication of a rotated version of the encryption key, wherein the first version of the encryption key comprises an archived version of the encryption key;

decrypt the data set using the archived version of the encryption key; and encrypt the data set using the rotated version of the encryption key.

18. The non-transitory computer-readable medium of claim 17, wherein:

the system call comprises a read command;

the encryption process comprises decrypting the data set based at least in part on the encryption key; and the version of the data set comprises plaintext associated with the data set.

19. The non-transitory computer-readable medium of claim 18, wherein the instructions are further executable by the processor to:

determine an identifier for the encryption key associated with the data set; and transmit a request for the encryption key based at least in part on the identifier for the encryption key.

20. The non-transitory computer-readable medium of claim 17, wherein:

the system call comprises a write command;

the encryption process comprises encrypting the data set based at least in part on the encryption key; and the version of the data set comprises ciphertext associated with the data set.

* * * * *